United States Patent [19]

Jackson

[11] Patent Number: 5,070,702

[45] Date of Patent: Dec. 10, 1991

[54] CONTINUOUSLY OPERATING $^3HE$ EVAPORATION REFRIGERATOR FOR SPACE FLIGHT

[76] Inventor: Henry W. Jackson, 222 S. Holliston #305, Pasadena, Calif. 91106

[21] Appl. No.: 519,817

[22] Filed: May 7, 1990

[51] Int. Cl.$^5$ ............................................. F25B 19/00
[52] U.S. Cl. ..................................................... 68/51.3
[58] Field of Search ........................................ 62/51.3

[56] References Cited

U.S. PATENT DOCUMENTS

| | | | |
|---|---|---|---|
| 3,195,322 | 7/1965 | London | 62/51.3 |
| 3,202,160 | 8/1965 | Barger | 62/51.3 |
| 4,136,526 | 1/1979 | Chanin et al. | 62/51.3 |
| 4,499,737 | 2/1985 | Binnig et al. | 62/51.3 |
| 4,672,823 | 6/1987 | Benoit et al. | 62/51.3 |
| 4,770,006 | 9/1988 | Roach et al. | 62/51.3 |

OTHER PUBLICATIONS

H. W. Jackson, "Millikelvin Range Refrigerator for Sensor Cooling", JPL New Technology Report No. NPO-15720 (1981).
H. W. Jackson, "Can $^3$He-$^4$He Dilution Refrigerators Operate Aboard Spacecraft?" Cryogenics 22, pp. 59-61 (1982).
H. W. Jackson, "Electrostriction in Liquid $^4$He", Phys. Rev. B 25, pp. 3127-3131 (1982).
D. Petrac, U. E. Israelsson, and H. W. Jackson, "Electric Field Generated Forces in Liquid $^4$He and in $^3$He/$^4$He Mixtures", Japanese J. Applied Phys. 26, pp. 45 and 46, Supplement 26-3 (1987).
U. E. Israelson, H. W. Jackson, and D. Petrac, "Liquid/Vapor Phase Separation in $^4$He Using Electric Fields", Cryogenics 28, pp. 120-126, (1988).
U. E. Israelsson, H. W. Jackson, and D. Petrac, "Control of the Interface Between $^3$He-Rich and $^4$He-Rich Phases Using Electric Fields", Advances in Cryogenic Engineering 33, pp. 713-717, Edited by R. W. Fast (Plenum, New York, 1988).
V. A. Mikheeve, V. A. Maidanov, and N. P. Mikhin, "Compact Dilution Refrigerator with a Cryogenic Circulation Cycle of $^3$He", Cryogenics 24, p. 190 (1984).
O. V. Lounasmaa, Experimental Principles and Methods Below 1K (Academic, New York, 1974), Especially Chapter 2.
J. S. Stratton, Electromagnetic Theory (McGraw-Hill, New York, 1941), Especially Chap. 2, Secs. 2.21 and 2.25.
H. A. Pohl, Dielectrophoresis, the Behavior of Neutral Matter in Nonuniform Electric Fields, (Cambridge University Press, New York, 1978), Especially Chapter 17.
J. B. Blackmon, "Collection of Liquid Propellants in Zero Gravity with Electric Fields", J. Spacecraft 2, pp. 391$\propto$398 (1965).
J. M. Meek and J. D. Craggs, Electrical Breakdown of Gases (Clarendon Press, Oxford, 1953).
J. Gerhold, "Dielectric Breakdown of Helium at Low Temperatures", Cryogenics 12, pp. 370-376 (1972).
Ch. Oliver, "Performance of Electrodes at the First Voltage Breakdown in Liquid Helium", IEEE Transactions on Magnetics, vol. Mag-17, pp. 2086-2088 (1981).
R. M. Ostermeier, I. G. Nolt, and J. V. Radostitz, "Capillary Confinement of Cryogens for Refrigerantion and Liquid Control in Space-I Theory", Cryogenics 18, pp. 83-86 (1978).
P. Kittel and W. F. Brooks, "Single Shot Demountable Self-Contained $^3$He Refrigerator", Advances in Cryogenic Engineering 27, pp. 727-734, Edited by R. W. Fast (Plenum, New York, 1982).

(List continued on next page.)

Primary Examiner—Ronald C. Capossela
Attorney, Agent, or Firm—William W. Haefliger

[57] ABSTRACT

A $^3$He evaporation refrigerator, comprising an evaporator having apparatus to localize liquid and vapor phases in selected regions while allowing evaporation of liquid to occur in normal operation; two adsorption pumps connected via vent ducts with the evaporator to receive $^3$He vapor, alternately, there being valve means associated with each pump; heater means associated with the pumps to cause $^3$He desorption by the pumps; a condenser-collector to receive desorbed $^3$He, and electric force means to hold $^3$He liquid at a flow path outlet from the condenser-collector; and a flow path from the condenser-collector back to the evaporator.

132 Claims, 10 Drawing Sheets

OTHER PUBLICATIONS

D. J. Ennis, P. Kittel, W. Brooks, A. Miller, and A. L. Spivak, "A Helium-3 Refrigerator Employing Capillary Confinement of Liquid Cryogen", *Refrigeration for Cryogenic Sensors* (Proc. of the Second Biennial Conference on Refrigeration for Cryogenic Sensors and Electronic Systems Held at NASA Goddard Space Flight Center; Greenbelt, Maryland; 1982) pp. 405–417.

P. Kittel and A. F. Rodriguez, "Design Considerations for a $^3$He Refrigerator for Space Applications", NASA TM 85973, Jul. 1984.

P. Kittel, "$^3$He Cooling Systems for Space-Status Report", NASA TM 85985, Jul. 1984.

P. Kittel, "Subkelvin Temperatures in Space", *Advances in Cryogenic Engineering* 27, pp. 745–749, Edited by R. W. Fast (Plenum, New York, 1982).

J. D. Daunt and E. Lerner, "A Closed-Cycle Joule-Thomson Liquefier and Cryostat for $^3$He", Cryogenics 10, pp. 476–479 (1970).

E. Ambler and R. B. Dove, "Continuously Operating $^3$He Refrigerator for Producing Temperatures Down to $\frac{1}{4}°$ K.", Reviews of Scientific Instruments 32, pp. 737–739 (1961).

A. W. Adamson, *Physical Chemistry of Surfaces*, 3rd Edition (Wiley, New York, 1976), Especially Chap. 1.

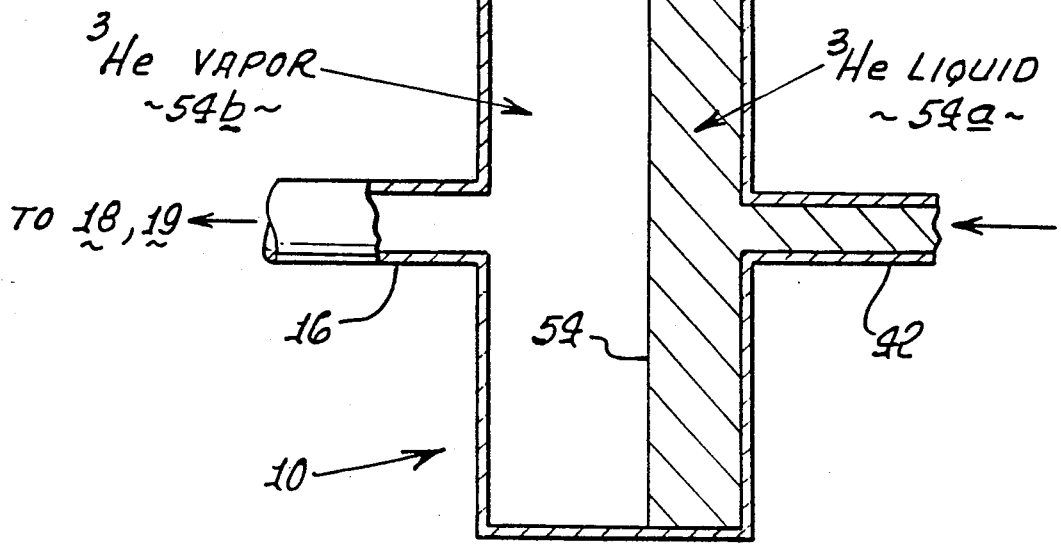
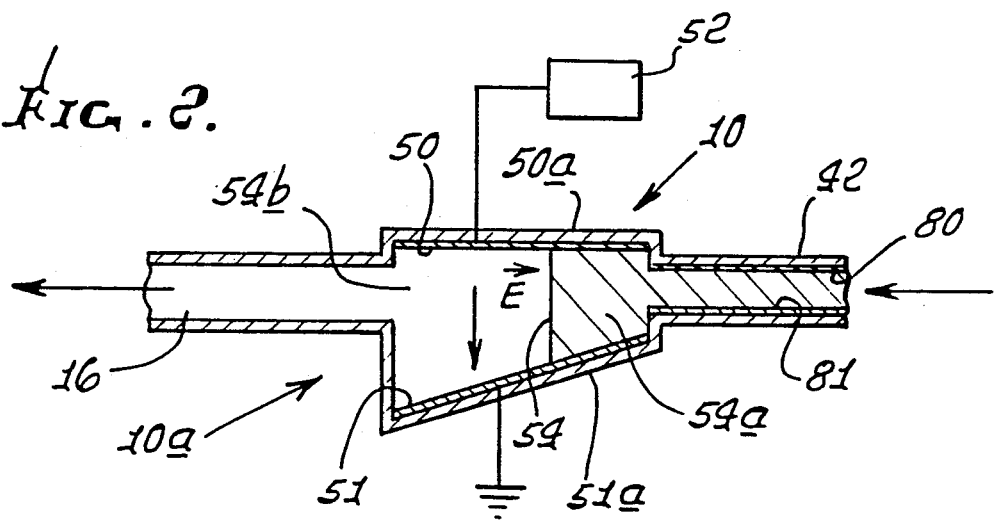
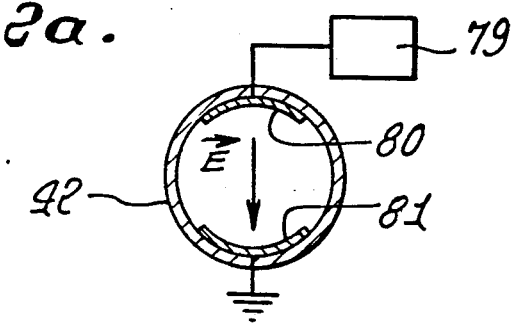

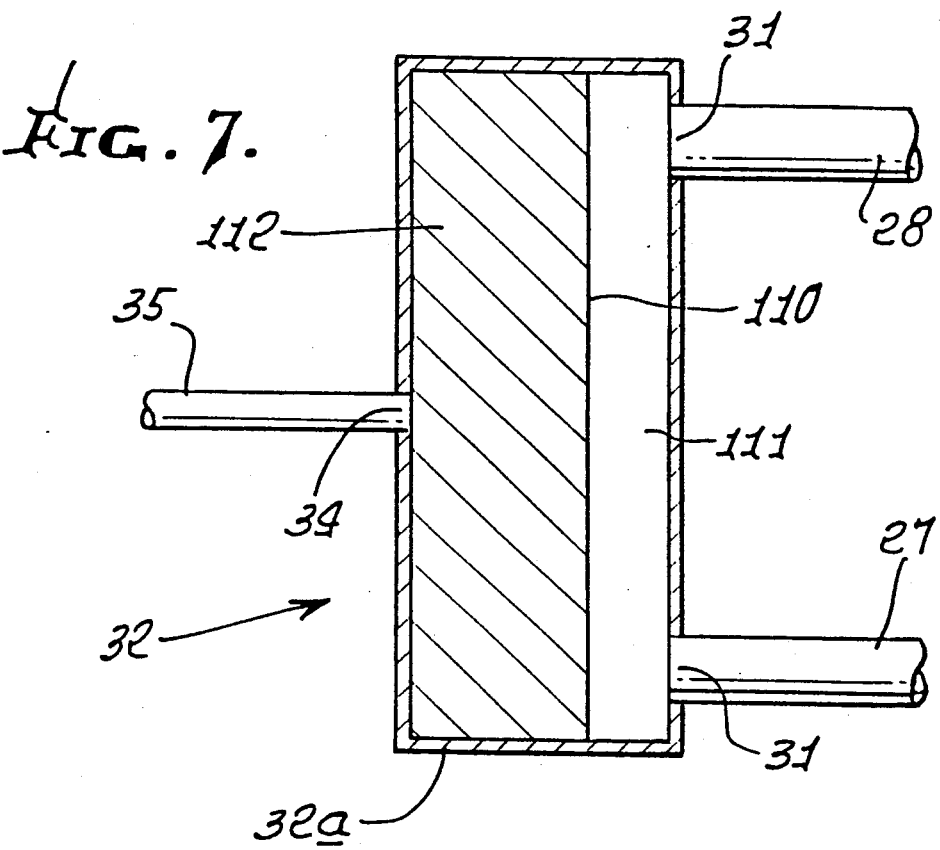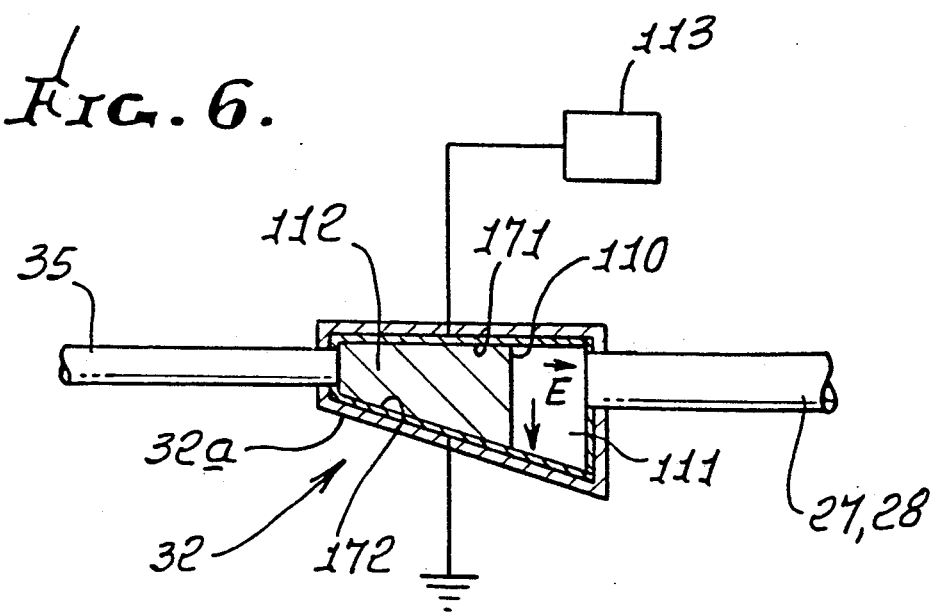

DIVERGENT FLAT PLATES

SEGMENTED FLAT PLATE WITH DIVERGENT PORTION

DIVERGENT FLAT PLATE AND CURVED PLATE

FLAT PLATES WITH VARIABLE VOLTAGE & FRINGE FIELDS $V_1 > V_2 > V_3 > V_4$

DIVERGENT CURVED PLATES

CONCENTRIC CURVED PLATES

FRINGE FIELD

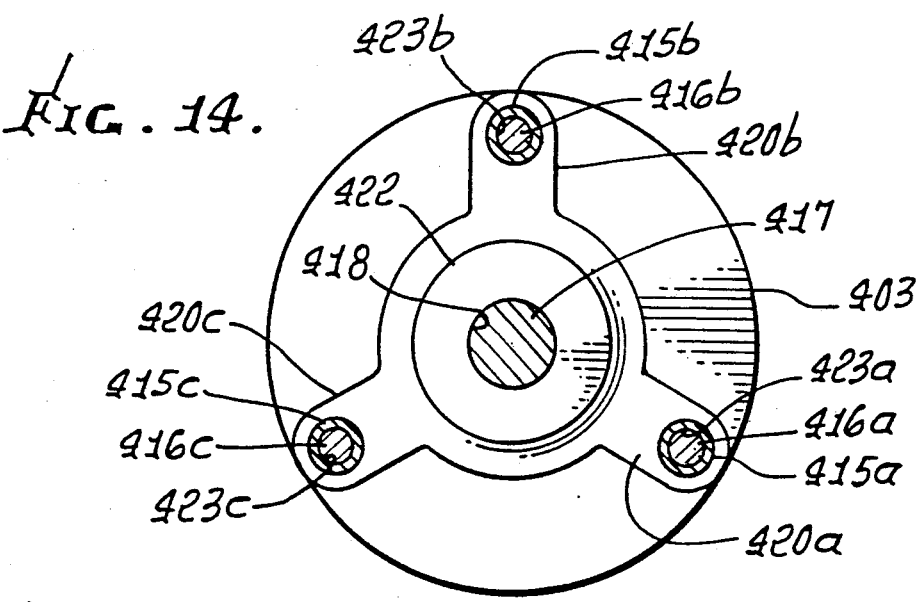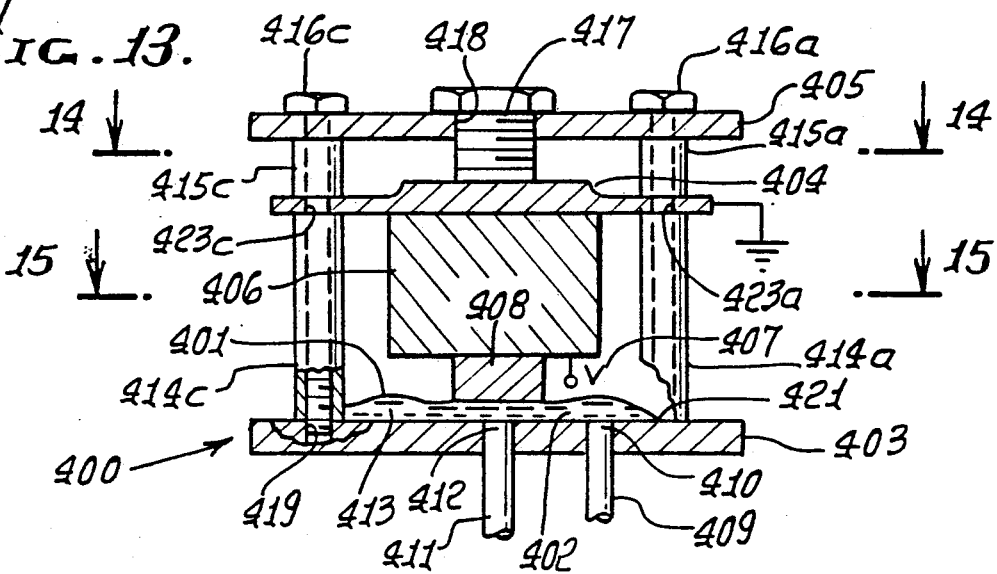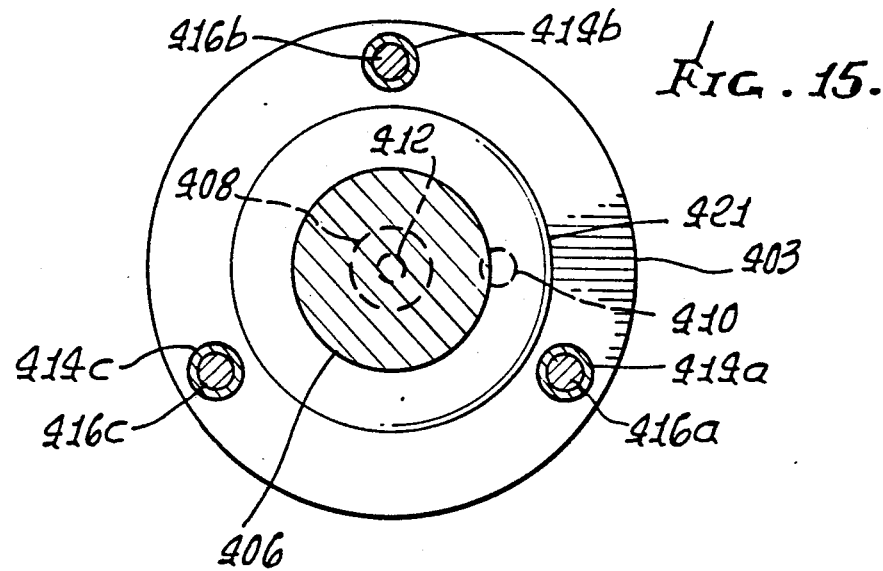

CONTINUOUSLY OPERATING 3$^{HE}$ EVAPORATION REFRIGERATOR FOR SPACE FLIGHT

BACKGROUND OF THE INVENTION

This invention relates generally to evaporation refrigerators, and more particularly to a continuously operating, $^3$He evaporation refrigerator well adapted to providing subkelvin temperatures in space flight environments.

There is need for the above type refrigerators for scientific experiments and apparatus that require very low temperatures, i.e. down to about 0.3K. In such a $^3$He evaporation refrigerator, the evaporator is the coldest part of the system during normal operation, and that is where heat is absorbed from an attached load or device that is to be cooled. During steady state operation where the temperature of the evaporator remains constant, the sum of the heat absorbed from the load and the parasitic heat leaking into the evaporator per second is just equal to the latent heat of atoms evaporated from the liquid there per second.

Localization of the liquid and vapor in selected regions and establishment and control of the interfaces between the liquid and vapor phases in the condenser-collector and in the evaporator are of prime importance. In a conventional evaporation refrigerator that operates in terrestrial laboratories, this is accomplished simply by gravity holding the liquid at the bottom of the condenser-collector and evaporator chambers. In the reduced gravity of space, the two phases will not be positioned in such a simple way in the absence of applied forces.

SUMMARY OF THE INVENTION

It is a major object of the invention to provide a $^3$He evaporation refrigerator that meets the above need, and thereby provides a very low temperature source, as required by scientific experiments conducted during space flights, and by associated scientific equipment and devices.

Devices that could benefit substantially include, but are not limited to, bolometers which are used for sensing x-ray, infrared, submillimeter, and millimeter wavelength electromagnetic radiation. Theoretically the sensitivity of some of these bolometers varies as $T^{-n}$, where T is operating temperature and n is 5/2 in an optimum design. For an optimum device, the sensitivity would increase by a factor of about 20 if the operating temperature were lowered from 1.0K to 0.3K while all other factors remained the same.

Another device that could benefit is the superconducting cavity stabilized oscillator (SCSO), which is currently being developed by NASA as an ultra-high precision clock. The stability of these clocks is expected to improve substantially as the temperature of the superconducting cavity is lowered below 1K. Such clocks require highly regulated, continuous cooling. This rules out adiabatic demagnetization refrigerators, which are basically one-shot devices that must be recycled intermittently. Space applications of the SCSO include gravity wave detectors, global positioning systems, and very long baseline interferometry.

Hydrogen masers are also under development as ultra-high precision clocks and they could also benefit from this invention. Their stability can be improved by cooling to subkelvin temperatures. Space applications of hydrogen maser clocks include gravity wave detection, global positioning systems, and very long baseline interferometry.

Also, new classes of particle detectors that require subkelvin temperatures are currently being developed. One such device is a new type of neutrino detector. This refrigerator could enable those new detectors to work in earth orbit and in other microgravity environments.

The space station is expected to provide new facilities for scientific experimentation in microgravity that will appreciably extend the opportunities that already exist on the space shuttle. The present refrigerator could be a useful part of those facilities. It could, for example, make possible studies of $^3$He - $^4$He mixtures below the tri-critical point. It could also be used to cool liquid $^4$He to around 0.3K in order to facilitate observation of decorated quantized vortex lines. Temperatures in this neighborhood were found to be essential in directly observing such vortices in terrestrial laboratories.

When operating in microgravity in the temperature range between about 1K and 0.3K, the electrically controlled $^3$He evaporation refrigerator that constitutes this invention will have some advantages over both $^3$He evaporation refrigerators based on capillary confinement alone and $^3$He - $^4$He dilution refrigerators, as explained below.

In this invention, electrical forces hold the liquid refrigerant at a flow path outlet from the condenser-collector and localize the liquid in a selected region in the condenser-collector, adjacent to the outlet. This reduces undesirable motion of the liquid and prevents displacement of the liquid into the $^3$He vapor duct due to adverse acceleration of the refrigerator during maneuvering of a spacecraft, for altitude control, for example. At the same time, liquid may be driven at variable and accurately controlled rates from the condenser-collector to the evaporator by a force associated with the saturated vapor pressure acting at the liquid-vapor interface in the condenser-collector. Providing that driving force is an essential feature of this refrigerator. Also, as will appear, an ability to vary and accurately control the liquid flow rate can be advantageously utilized in at least two ways. One is to help match the cooling power of the refrigerator to the heat load to be cooled in steady state operation of the refrigerator. The second is to adjust the volume of liquid in the evaporator so that the lowest temperature attainable in practice by a given refrigerator is reduced and is essentially the same in a microgravity environment as on earth.

An existing description of a continuously operating $^3$He evaporation refrigerator that depends on capillary forces alone for liquid confinement does not address these problems. That description does not state how fluid displacement into the vapor duct is to be avoided during adverse accelerations of the refrigerator. The matters of providing the driving force for liquid flow from condenser-collector to evaporator and of varying and controlling the liquid flow rate are not addressed in that description either.

The development of single cycle $^3$He evaporation refrigerators relying on capillary forces alone for liquid confinement is much further advanced than the development of a continuous version. A system of two or more single cycle refrigerators in combination with a system of heat switches, and cooling alternately, can approximate the performance of a continuous refrigerator. Each single cycle refrigerator is connected to the load to be cooled during the interval that it can supply cooling power, and disconnected from the load while that refrigerator is being regenerated for the next cycle. Therefore a description of the state of development of single cycle $^3$He refrigerators is relevant to a continuously operating refrigerator.

Some results for a prototype $^3$He single-cycle evaporation refrigerator based on capillary confinement using a porous sponge have been reported in the literature. The refrigerator was operated in an inverted position in a terrestrial laboratory to demonstrate liquid confinement by the sponge. For that mode of operation, the lowest temperature reached was 0.55k, well above the lower limit of about 0.3K frequently attained in conventional $^3$He evaporation refrigerators operating on earth.

Operation in the inverted position was a more stringent test of the surface tension confinement principle than would occur in space. However, operation in that position is *not* a more unfavorable condition than operation in space insofar as one is concerned with reaching low temperatures with the same refrigerator. This can be understood as follows. The liquid was pumped from the bottom of the sintered metallic sponge that was used to confine the liquid while the refrigerator was inverted. Gravity causes the liquid-vapor interface to be near the bottom of the sponge. Therefore the evaporated atoms did not have to travel any appreciable distance through the sponge en route to the vent. Theory indicates that there are many metastable positions of the liquid in a sintered sponge. In space many of those metastable positions will have liquid-vapor interfaces in the interior of the sponge. There can be an appreciable pressure drop as the vapor flows through the sponge to its outer boundary. Because of this pressure drop, the evaporation rate and vapor flow rate will be reduced and the lowest temperature attainable using a given pump will be higher. Furthermore, the existence of a multiplicity of metastable positions of the liquid can result in unpredictable behavior of the refrigerator because the position of the liquid-vapor interface will change as the liquid is depleted from the sponge in any given cycle, and the starting locations of those interfaces will be different for different cycles. These problems can be mitigated to some extent by using larger pore sizes in the sponge for a refrigerator operating in space. However, then the flight refrigerator can not be fully tested on earth before the flight by operating it in an inverted position.

Measurements on a prototype helium evaporation refrigerator based on capillary confinement give indications that the liquid boils from its interior at high heat loads, significantly reducing the efficiency of the refrigerator under these conditions.

In the electrically controlled $^3$He evaporation refrigerator that comprises the present invention, evaporation and associated cooling occur at a well-defined boundary between the bulk liquid and the vapor, or at a liquid-vapor interface that is at the outer surface of a porous sponge. Therefore this electrically controlled refrigerator avoids the disadvantages described above for a capillary confinement refrigerator.

For a given pumping speed, the cooling power of a $^3$He evaporation refrigerator is greater than that of a $^3$He - $^3$He dilution refrigerator above 0.4K. This, together with the fact that a $^3$He evaporation refrigerator is simpler to construct and operate than a dilution refrigerator, provide significant advantages over a dilution unit in the subkelvin range above 0.4K.

Basically, the invention is a $^3$He liquid refrigerant evaporation refrigerator embodied in the combination that includes:

a) an evaporator including means to position liquid and vapor phases in selected locations while allowing evaporation of liquid to occur in normal operation, b) two adsorption pumps connected via vent ducts with the evaporator to receive $^3$He vapor, alternately, there being valve means associated with each pump, c) heater means associated with the pumps to cause $^3$He desorption by the pumps, d) a condenser-collector to receive desorbed $^3$He, and means for producing electric forces to hold refrigerant liquid at a flow path outlet from the condenser-collector, e) and a liquid refrigerant flow path between the condenser-collector and the evaporator.

As will appear, the flow path is typically defined by a capillary and the liquid refrigerant in the condenser-collector is localized in a region adjacent to the capillary inlet.

The condenser-collector is always just partly filled with liquid, and the pressure there is that of the saturated vapor. That pressure acts on the liquid-vapor boundary and is transmitted through the liquid so that it ultimately forces liquid into the capillary.

It is another object to provide a condenser-collector in the form of a container having electrically conducting inner walls held apart by insulating walls, and arranged so that a voltage applied across the conductors produces a non-uniform electric field in the space between the conductors. The non-uniform field has the highest electric field intensities in regions adjacent to the liquid refrigerant flow path outlet from the condenser-collector, so that liquid refrigerant, having higher dielectric constant, is held there. Vapor refrigerant, having lower dielectric constant, is positioned in other regions, where electric field intensities are lower.

Yet another object is to provide an evaporator in the form of a container having electrically conducting inner walls held apart by insulating walls, and arranged so that a voltage applied across the conductors produces a non-uniform electric field in the space between the conductors. The non-uniform field has the highest electric field intensities in regions adjacent to the liquid refrigerant flow path inlet to the evaporator, so that liquid refrigerant, having higher dielectric constant, is held there. Vapor refrigerant, having lower dielectric constant, is positioned in other regions, where electric field intensities are lower.

Yet another object is to provide an evaporator in the form of a container partly filled with a porous sponge. The sponge is located near a liquid refrigerant flow path inlet to the evaporator. The porous sponge is shaped so that an inner space is provided adjacent t the liquid refrigerant flow path inlet to the evaporator, where liquid refrigerant can accumulate. Part of the porous sponge boundary with that inner space is lined with material impermeable to liquid refrigerant. A guard ring made of material impermeable to liquid refrigerant extends laterally from the edge of that liner into the porous sponge. The porous sponge, liquid accumulation inner space, liner, and guard ring provide means for confining liquid refrigerant in the sponge by capillary forces, while permitting evaporation of liquid from the outer surface of the sponge. The confining means is effective in earth's gravity and in a microgravity environment.

Yet another object is to provide said porous sponge made of electrically conducting material, and an electrically conducting plate held apart from the sponge by electrically insulating supports, or walls. The outer surface of the sponge and the separate conducting plate are shaped and arranged so that a non-uniform electric field is produced in the space between them when voltage is applied across the conductors. The non-uniform field has the highest electric field intensities in regions adjacent to the outer surface of the sponge, so that liquid refrigerant overflowing from the sponge will tend to be held in those regions because of its relatively high dielectric constant. Vapor refrigerant, having relatively low dielectric constant, will tend to be positioned in regions more distant from the sponge outer surface, where the electric field intensities are lower. This electrode arrangement confines the liquid and permits evaporation at the interface between bulk liquid and vapor under microgravity conditions and reduces the minimum temperature attainable by a given evaporation refrigerator in microgravity. This arrangement also extends the range of conditions for which this lowest temperature can be attained and simplifies the control of the refrigerator to match the cooling power to the attached heat load. On the other hand, on earth, the liquid refrigerant will tend to accumulate at the bottom of the porous sponge due to gravitational forces. In this case, to observe the useful liquid confinement properties of the sponge, the evaporator should be oriented so that the liquid refrigerant inner space defined by the sponge is above the outer boundary where liquid can evaporate. Evaporation of liquid at the bottom surface of the sponge is nearly as effective in producing cooling as evaporation at the surface of bulk liquid. The electric field will result in only a slight increase in cooling power or a slight lowering of the evaporator temperature by causing a liquid film to form on the bottom surface of the sponge. On earth, the combination of the sponge, liquid accumulation inner space, liner, and guard ring aided by gravitational force provides means for reducing the lowest temperature attainable by a given refrigerator. Either with or without the application of the electric field the lowest temperature attainable by that refrigerator on earth will almost equal the lowest temperature attainable by that same refrigerator utilizing an electric field and operating in a microgravity environment.

Yet another object is to provide electric heaters located in heating relation with the pumps, to match the cooling power of the evaporator with a heat load, for steady state operation. In this regard, a heat reservoir is typically located in thermal communication with the pumps. Also a heat reservoir is typically located in thermal communication with the condenser-collector. An electric heater is also provided at the condenser-collector to adjust the temperature, and in turn the saturated vapor pressure therein.

The valves may advantageously include annular seats and stoppers in the form of balls or ball portions that move toward and away from the seats in response to solenoid produced magnetic field variation. The seats or surfaces typically consist of soft metal such as gold, and the stoppers are attracted or repelled by the magnetic field. Portions of the stopper or stoppers may be magnetized, either permanently or temporarily, for solenoid activation. This includes the case where portions of the stopper are made of superconducting materials which are diamagnetic. The solenoid may be made of superconducting material to reduce undesired electrical heating of the coil.

A further object is to provide for refrigerant liquid flow from the condenser-collector through a capillary to a heat exchanger, the returning liquid refrigerant then moving through a flow impedance. The main purpose of that flow impedance is to permit the pressure to build up in the condenser-collector so that the refrigerant will condense there, and to permit the pressure to drop from that of the saturated vapor of $^3$He at 2K in the condenser-collector to the saturated vapor pressure of $^3$He in the evaporator without having an excessively large mass flow rate. The location of the impedance is such that the liquid will tend not to become superheated during normal operation of the refrigerator, thereby suppressing formation of bubbles in the capillaries. A second flow impedance may be located downstream of the first flow impedance and next to the evaporator inlet. The purpose of the second impedance is to further suppress bubble formation due to superheating of the liquid in the flow path. Parasitic heat flow into the evaporator stemming from viscous heating of liquid travelling through flow impedances is lower in the arrangement that includes two flow impedances, than it would be if the flow path included just one flow impedance located next to the evaporator inlet.

Yet another object is to provide a variable flow impedance device which can be actively controlled and which can change the dimensions of a portion of a flow path for liquid or for vapor.

In one embodiment of the invention, the capillaries are of an electrostatic type, in which the inner walls of an electrically insulating tube are partly coated with a metallic film. A voltage source connected across the metallized regions establishes an electric field in the interior of the capillary. The purpose of that field is to suppress the formation of bubbles in the capillary by making a bubble unfavorable thermodynamically because it raises the free energy of the system. If bubbles did develop there, they could form a vapor lock, stopping the flow of liquid.

The cooling power of the refrigerator can be controlled and matched to a heat load for steady state operation by: (1) adjusting the temperature of the liquid in the condenser-collector, and in turn the saturated vapor pressure there, through the use of an electrical heater and a thermal impedance link to a heat reservoir, thereby controlling the force that drives liquid through the flow path from the condenser-collector to the evaporator; (2) adjusting the rate of flow of liquid from the condenser-collector to the evaporator with a variable flow impedance in that flow path; (3) adjusting the rate of flow of vapor from the evaporator to an adsorption pump by a variable flow impedance in the vapor flow path; (4) adjusting the temperature of each adsorption pump during the interval that it is adsorbing refrigerant using an electrical heater and a thermal impedance between the pump and a heat reservoir; and (5) in the case of a wedge-shaped electrically controlled evaporator, adjusting the amount of liquid in the evaporator using a heat pulse or cooling pulse for a limited time duration at the condenser-collector. This controls the liquid flow rate through the flow path directly. Because the evaporator is wedge-shaped, the amount of liquid in the evaporator affects the area of the liquid-vapor interface in the evaporator and thereby influences the rate of evaporation there. Instead of using a heat pulse or cooling pulse at the condenser-collector, step changes in a variable flow impedance in the flow path from condenser-collector to the evaporator could be used to change the amount of liquid in the evaporator.

These and other objects and advantages of the invention, as well as the details of an illustrative embodiment, will be more fully understood from the following specification and drawings, in which:

DRAWING DESCRIPTION

FIG. 2 is a side elevation showing an electric force controlled evaporator; and

FIG. 2a shows an electrostatic capillary cross section;

FIG. 3 is a top plan view of the FIG. 2 evaporator;

FIG. 6 is a side elevation showing an electric force controlled condenser-collector;

FIG. 7 is a plan view of the FIG. 6 condenser-collector; and

FIG. 13 is a side elevation showing a variable flow impedance device controlled by a pile of piezoelectric plates;

FIG. 14 is a plan view taken on lines 14—14 of FIG. 13;

FIG. 15 is a plan view taken on lines 15—15 of FIG. 13;

GENERAL ORGANIZATION

Figure 1:
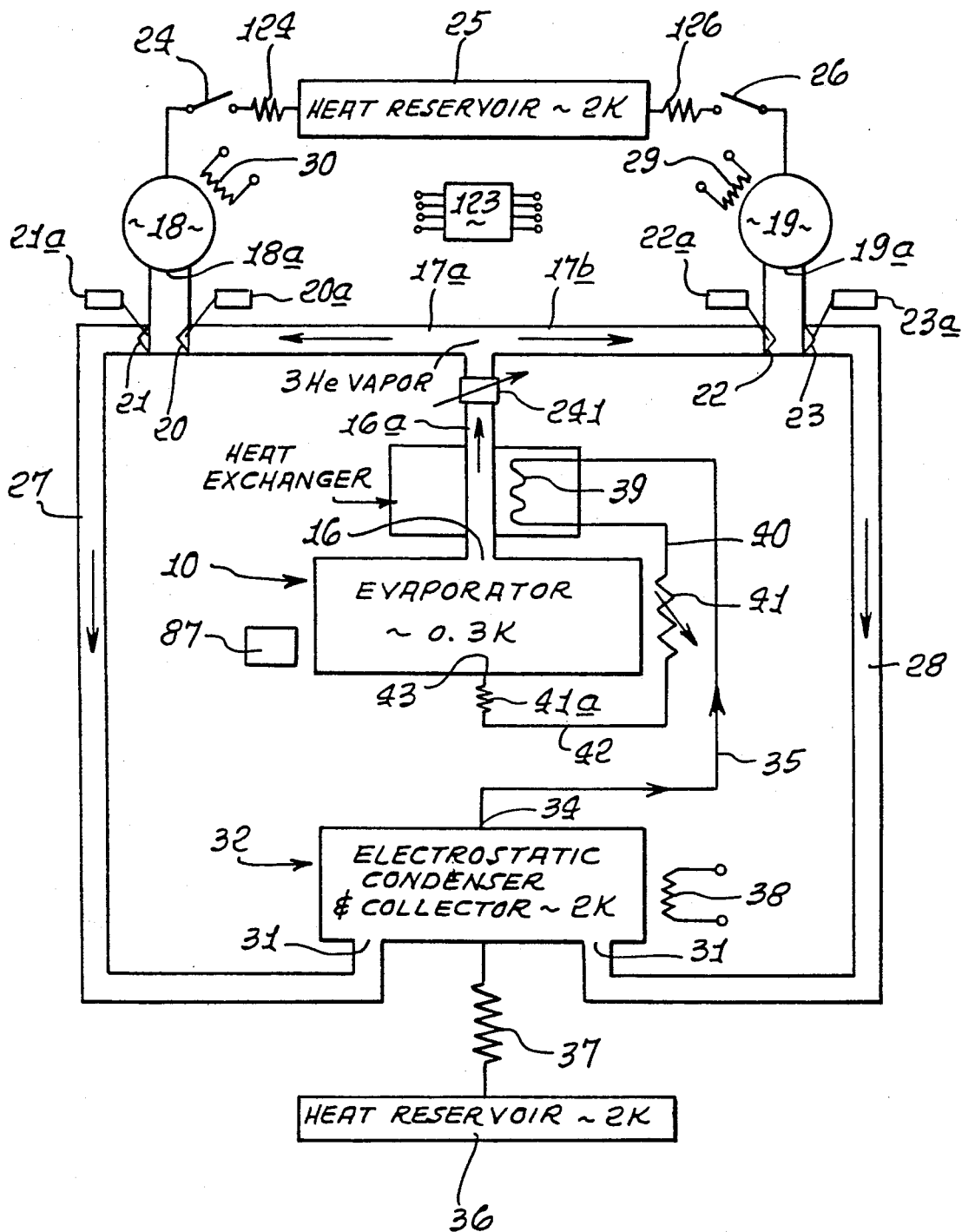
FIG. 1 is a schematic diagram of one overall system embodying the invention.

Referring to FIG. 1 an evaporator chamber is indicated at 10. It contains $^3$He liquid and gaseous phases subject to separation in response to electrostatic force application, capillary force application, or a combination of the two. The chamber has an outlet at 16 for the $^3$He that has passed through an interface between these two phases, to produce cooling. The evaporator chamber is the coldest part of the system during normal operation and that is where heat is absorbed from an attached load or device that is to be cooled. During steady state operation where the temperature of the chamber remains constant, the rate at which heat is absorbed from the load plus the rate at which parasitic heat flows into the chamber is just equal to the rate at which heat is added to the $^3$He atoms that migrate across the interface which separates the liquid phase from the gas phase in the chamber. This latter quantity is just the latent heat of vaporization. A net evaporation of $^3$He atoms will occur at the liquid-vapor interface when an adsorption pump causes the pressure to be reduced at the evaporator.

Two adsorption pumps 18 and 19 are connected with the evaporator outlet 16, as via ducts 17a and 17b. The pumps are arranged in circuit parallel, and have inlets 18a and 19a. Two check valves 20 and 21 are connected with inlet 18a, and two check valves 22 and 23 are connected with inlet 19a. A control for the valves is indicated at 123, and it may, for example, control solenoid actuators 20a, 21a, 22a and 23a for the valves. The operation is such that the pumps alternately receive $^3$He vapor, for adsorption; thus, during one time interval $\Delta_1$ when valve 20 is open and valve 21 closed, the pump 18 operates to adsorb $^3$He vapor, by virtue of connection of that pump, via closing of heat switch 24, to a heat reservoir 25 (say, at 2K) through the thermal impedance 124; and alternately, during a subsequent time interval $\Delta_2$, when valve 22 is open and valve 23 is closed, the pump 19 operates to adsorb $^3$He vapor, by virtue of connection of that pump, via closing of heat switch 26, to the heat sink 25 through the thermal impedance 126. Switches 24 and 26 are also typically operated by the master control 123.

During time interval $\Delta_1$, valve 22 is closed, and valve 23 open, so that $^3$He vapor may be desorbed by pump 19 and may flow to line 28. Heat switch 26 is then open, and the pump 19 is heated as by an electrical resistance heater 29, controlled by 123. During time interval $\Delta_2$, valve 20 is closed and valve 21 open, so that $^3$He vapor may be desorbed by pump 18 and may flow to line 27. Heat switch 24 is then open, and pump 18 is heated as by electrical resistance heater 30, controlled by 123.

The thermal impedance 124 and heater 30 controlled by 123 permit the temperature of pump 18 and in turn the rate of adsorption by that pump to be regulated during time interval $\Delta_1$. During time interval $\Delta_2$ the desorption rate by pump 18 can be regulated by heater 30 controlled by 123. Similarly, pump 19 adsorption and desorption rates can be controlled with the aid of thermal impedance 126 and heater 29 and control 123.

The two return lines 27 and 28 may be regarded as in circuit parallel, and they conduct $^3$He vapor to the inlet or inlets 31 to a condenser-collector 32. That collector has an outlet at 34, i.e. at the entrance to a capillary duct 35 that returns liquid $^3$He toward the evaporator. Coupled to the condenser-collector chamber are a heat reservoir 36, via thermal impedance 37, and a heater 38 such as an electrical resistance heater, controlled at 123. The condensed liquid in the condenser-collector, seen in FIGS. 6 and 7, is held next to the entrance of capillary 35 by electrical forces in the condenser-collector, utilizing the same principles as are employed in an electrostatic version of the evaporator, an interface being established between liquid and vapor phases. The condenser-collector is always just partly filled with liquid, and the pressure there is that of the saturated vapor. That pressure acts on the liquid-vapor boundary and forces liquid into the capillary 35.

Liquid $^3$He flows through the capillary duct 35 to a heat exchanger 39 that is thermally coupled to the vapor vent duct from the evaporator. That heat exchanger may simply be a coiled capillary that is heat transfer coupled to vent tube 16a communicating between 16 and 17a and 17b. The ³He liquid leaving 39 then moves via duct 40 to and through a flow impedance 41. In practice, that flow impedance may be a constriction near the exit of the coil heat exchanger or it may be a controlled variable flow impedance shown in FIGS. 13, 14 and 15. The liquid is then conducted by a capillary 42 to a second flow impedance 41a. Immediately after passing through impedance 41a, the liquid flows into the lower entrance 43 to the evaporator chamber. See also the variable flow impedance 241 in the vapor vent duct 16a from evaporator 10, and communicating with 17a and 17b.

The main purposes of the flow impedance 41 are to enable the pressure to build up in the condenser-collector so that vapor can condense to liquid there, and to permit the pressure to drop from that of the saturated vapor of ³He at 2K in the condenser-collector 32 to the saturated vapor pressure of ³He in the evaporator without having an excessively large mass flow rate. The impedance is located in such a manner that the liquid will tend not to become superheated during normal operation, thereby suppressing formation of bubbles in the capillaries and other components in the path between the exit of the condenser-collector at 34 and the entrance to the evaporator at 43. The flow impedance 41a helps to further suppress bubble formation in the flow path while minimizing that part of the parasitic heat input to the evaporator associated with viscous heating of liquid travelling through flow impedances.

ADDITIONAL DESCRIPTION electrical forces localize the liquid in the evaporator when in a microgravity environment, as described next.

As seen in FIGS. 2 and 3, showing an evaporator 10, two or more electrically conducting plates 50 and 51, in a stack, are connected to a voltage source 52 so that there is an electric field across the plates and the magnitude of the field has a gradient along the length of the plates, due for example to tapering of the distance, or gap, formed between two plates, as shown, thereby forming a wedge shaped structure. Walls 50a and 51a may be interiorly plated at 50 and 51.

In a preferred embodiment of the invention, the electric field is almost transverse to the plates (see FIG. 2). When neutral atoms such as un-ionized ³He are placed in an electric field, the atoms acquire dipole moments, and those dipole moments have a certain amount of free energy per unit volume associated with them.

$$\text{Free Energy} = -\tfrac{1}{2}\vec{P}\cdot\vec{E}$$

where $\vec{P}$ is the polarization (i.e., total dipole moment per unit volume) and $\vec{E}$ is the electric field. The induced dipole moment per atom is directly proportional to the electric field, and the free energy per atom is therefore proportional to $E^2$. A variation in the magnitude of $\vec{E}$, and in turn of $E^2$, produces a force on the atoms urging them to move in such a way as to make the free energy of the system as low as possible. That means that when the atoms in the space between the plates are left to come to thermodynamic equilibrium, they will tend to accumulate in the region of highest electric field and be held there. ³He atoms in the vapor and liquid have the same atomic polarizability, so that the difference in the free energy per unit volume is determined by the number densities. The liquid phase 54a has the higher number density. Therefore the thermodynamic free energy will be lowest if the liquid accumulates in the region of highest electric field. The vapor phase 54b tends to move to regions between the plates where the electric field is lower. Separation of the phases thereby occurs with a well-defined interface, indicated at 54.

In one embodiment of the invention, the capillaries (ducts) are of electrostatic type, in which the inner walls of an electrically insulating tube are partly coated with a metal film, as seen in the cross section of a capillary in FIG. 2a. A voltage source 79 connected across the metallized regions 80 and 81 establishes an electric field in the interior of the capillary, transverse to its length. The purpose of that field is to suppress the formation of bubbles in the capillary. Bubbles could possibly form a vapor lock that would stop the flow of liquid.

Referring again to FIG. 1, the cooling power of the refrigerator can be controlled and matched to a heat load for steady state operation by: (1) adjusting the temperature of the liquid in the condenser-collector 32, and in turn the vapor pressure therein, through the use of an adjustable electrical heater 38 and a thermal impedance link 37 to the heat reservoir 36, thereby controlling the force that drives liquid through the flow paths 35 and 39-42 from the condenser-collector 32 to the evaporator 10, and (2) adjusting the rate of flow of liquid from the condenser-collector 32 to the evaporator 10 with a variable impedance 41 (see also 400 in FIG. 13) in the flow paths 35 and 39-42, and (3) adjusting the rate of flow of vapor from the evaporator 10 to adsorption pumps 18 and 19 by a variable flow impedance 241 (see also 400 in FIG. 13) in the flow path 16a, and (4) adjusting the temperatures of adsorption pumps 18 and 19 by using and adjusting electrical heaters 29 and 30, and (5) in the case of a wedge-shaped electrically controlled evaporator 10a (see FIG. 2), adjusting the amount of liquid 54a in the evaporator using a heat pulse or cooling pulse for a limited time duration at the condenser-collector 32 using heater 38. This controls the liquid flow rate through the flow path 35 and 39-42 directly. Because the evaporator is wedge-shaped, the amount of liquid in the evaporator determines the area of the liquid-vapor interface 54 and thereby influences the rate of evaporation at the interface, and (6) using step changes in a variable flow impedance 41 (see also 400) in the flow path from the condenser-collector 32 to the evaporator 10a (see FIG. 2) to change the amount of liquid in the evaporator and in turn to adjust the area of the liquid-vapor interface 54 in the evaporator.

At start-up, pumping on the evaporator reduces the pressure therein and results in lowering the temperature of the evaporator, which is the coldest part of the refrigerator in normal operation. The load to be cooled, which appears at 87, is thermally coupled to 10.

Figure 4:
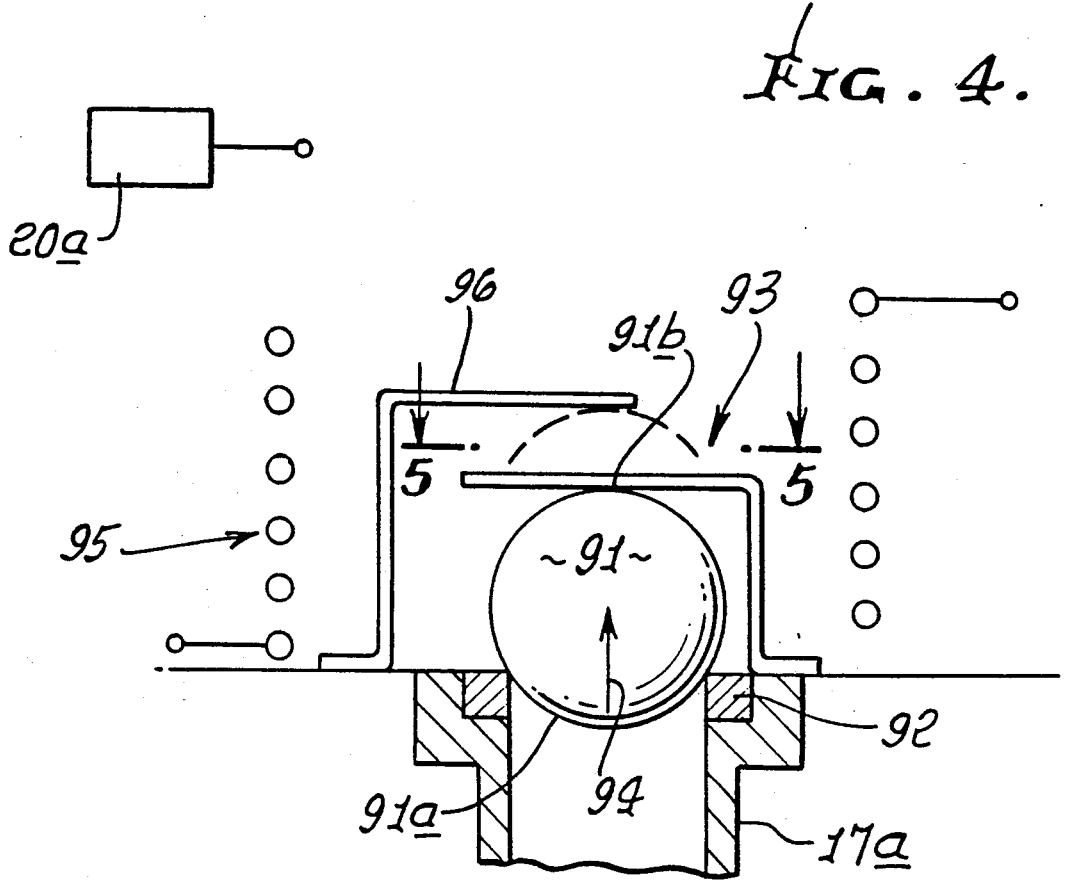
FIG. 4 is a section taken through a solenoid operated valve.
Figure 5:
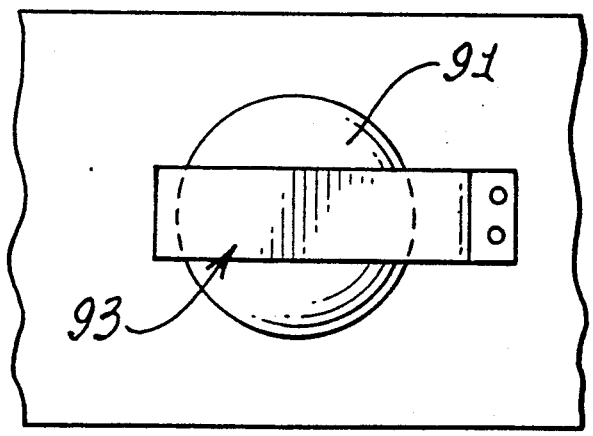
FIG. 5 is a plan view taken on lines 5—5 of FIG. 4.

The path of vapor flow is controlled at 20-23 by miniature solenoid valves especially designed and adapted for this application (see FIGS. 4 and 5). For example when the valve 20 is closed, the stopper or gate 91 consisting of a hard metal sphere (or other body having a spherical surface portion at 91a) is seated in a ring seat 92 made of soft metal such as gold. A flat spring 93 attached to the stopper at 91b holds it closed. In one embodiment of the valve, the stopper is made of alnico V, magnetized in the direction shown, by arrow 94, in the figure. A superconducting solenoid coil 95 is positioned so that when an electrical current passes through it, its magnetic field can pull the magnetized sphere up and open the valve. Because the solenoid is made of superconductive material, it will not generate Joule heat that could degrade the performance of the refrigerator. Passing current through the solenoid in the opposite direction tends to close the valve tighter than the spring acting alone. This can be utilized to improve seating of the stopper as the soft metal ring wears away due to repeated use. A metal bracket 96 limits the opening travel of the stopper.

FIGS. 6 and 7 show a condenser-collector 32, having a chamber 32a within which an interface 110 is defined between $^3$He return vapor 111, and $^3$He liquid at 112, at about 2.0K. See return vapor ducts 27 and 28, and $^3$He liquid return duct 35. As before, portions of the inner walls of the chamber 32a may be metallized to form a plate 171 and electrically charged, as by voltage source 113. A grounded plate on the opposite wall is seen at 172, and an electric field E is produced between 171 and 172.

Either direct current or alternating current voltages may be applied across conductors in the condenser-collector, electrostatic evaporator, combination porous sponge - electrically controlled evaporator or electrostatic capillaries for the purpose of holding the liquids in certain locations while excluding vapor from those locations, as required for operation of the refrigerator. Alternating current voltages reduce the disruptive effects of any free electric charges that may be present in the liquid or at liquid boundaries with the vapor.

Instead of employing divergent flat plates in the condenser-collector (see FIGS. 6 and 7), or in the evaporator arrangement shown in FIGS. 2 and 3, the electric field gradient therein could be provided by curved plates, or by the fringing fields of parallel plates, or by a set of neighboring parallel plate capacitors having different voltages across them.

Instead of the single solenoid and the stopper shown in FIGS. 4 and 5, two solenoids could be used with a stopper consisting of a soft iron ball. The solenoids would then be positioned above and below the gate is such a way that one solenoid would pull the stopper away from the seat, and the other solenoid would pull it shut.

Instead of the single solenoid and the stopper shown in FIGS. 4 and 5, two solenoids could be used with a stopper consisting of a superconducting material that is diamagnetic. The solenoids would then be positioned above and below the gate in such a way that one solenoid would push the stopper away from the seat, and the other would push it shut.

A new and highly valuable feature of this invention is its capability for operation in a horizontal orientation in earth's gravity. Furthermore, it can be arranged so that in the horizontal orientation all of the mechanisms for localizing the liquid and vapor phases can be tested on a flight version of the refrigerator, thereby increasing its reliability.

Dielectric breakdown limits the voltage that can be usefully applied across conductors throughout the refrigerator. The electric field strengths required for positioning the liquid and vapor phases in the condenser-collector can be achieved with due care in either microgravity or for a horizontally oriented refrigerator in earth's gravity. The electric field strengths required for positioning the liquid and vapor in the electrostatic evaporator can also be achieved without dielectric breakdown with due care in microgravity. Dielectric breakdown is a problem even for a horizontally oriented refrigerator using $^3$He refrigerant and an electrostatic evaporator in earth's gravity. For these conditions, the lowest practical temperature for operating the wedge-shaped $^3$He evaporator in FIG. 2, with plates about 2 or 3 centimeters long and plate separation distance of about a millimeter, may be around 1K. As will appear, evaporator arrangements using a porous sponge or a combination of a porous sponge and electric force control of liquid provide means for attaining lower temperatures, down to about 0.3K on earth and in microgravity. When refrigerants other than helium are used, dielectric breakdown is a less severe problem in the electrostatic evaporator.

The incorporation of electric fields in the capillaries to inhibit formation of large bubbles that could produce vapor locks there is of great advantage toward promoting predictable and trouble-free operation of the refrigerator under microgravity conditions. Furthermore, those electric fields produce an effective pressure that can be used to help clear a vapor lock so that the refrigerator can be restarted in a space environment if necessary.

The solenoid valves that operate at low temperatures incorporate a construction having advantages that include suitability for miniaturization, use of a superconducting solenoid to eliminate Joule heating, and use of a sphere surface for the valve stopper. The latter presents a circular perimeter to the soft metal seat in which it seats when closed, and thereby simplifies the problem of obtaining a good seal without requiring highly accurate alignment of the parts. (A conical stopper, if slightly tilted, would present an elliptical perimeter to the circular boundary in which it seats when closed, which would interfere with good seating).

FIGS. 8a-8g show various conducting plate configurations usable in the above described condenser-collector and electrically-controlled evaporator elements, and illustrating the interface between two helium phases in microgravity. In each of these configurations as shown, the shaded region (or regions) inside the chamber and capillaries corresponds to the helium phase with a higher dielectric constant; and the unshaded region corresponds to the helium phase with the lower dielectric constant.

In the evaporator, the liquid helium phase has a higher dielectric constant than the vapor phase.

In the condenser-collector, the liquid helium phase has a higher dielectric constant than the vapor phase.

Under microgravity conditions, the interface is determined approximately by the condition $E^2$=constant. The relative dielectric constant of helium$\approx$1, so electric displacement $$\vec{D}=E\epsilon\vec{E}\approx\epsilon\vec{E},$$

and the value of $E^2$ is about the same as when the refrigerant is absent.

Further, each configuration 8a-8g may be the cross-section of a plate configuration that is uniform in the direction perpendicular to the plane of the paper. Alternatively, each of the configurations 8a-8f may be half of the cross-section of a plate configuration with cylindrical symmetry about an axis at the left hand edge of the plates.

Figure 8A:
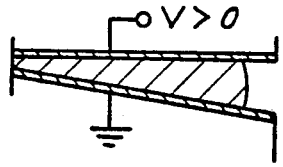
FIGS. 8a-8h are schematic views showing various conducting plate configurations.
Figure 8E:
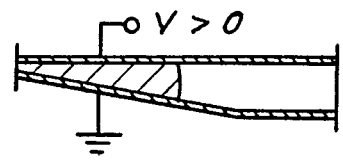
Figure 8B:
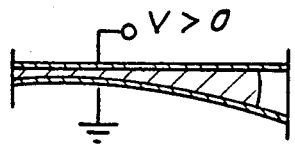
Figure 8F:
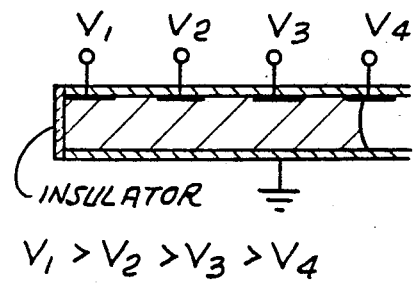
Figure 8C:
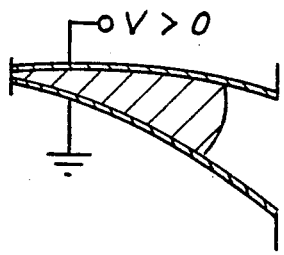
Figure 8G:
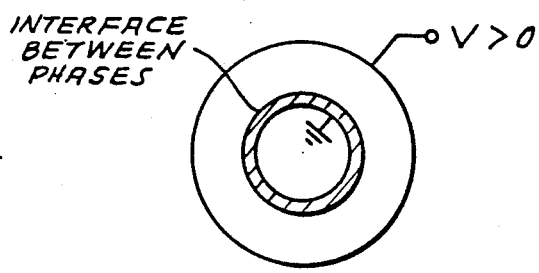
Figure 8D:
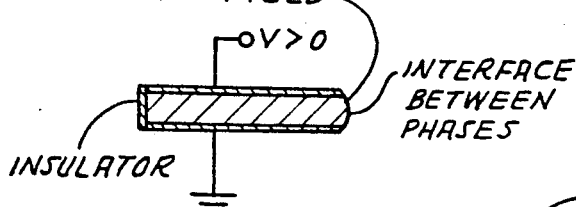

In an additional alternative, FIG. 8g may be for example, the cross-section of a plate configuration with spherical symmetry about the center of the two plates.

Figure 8H:
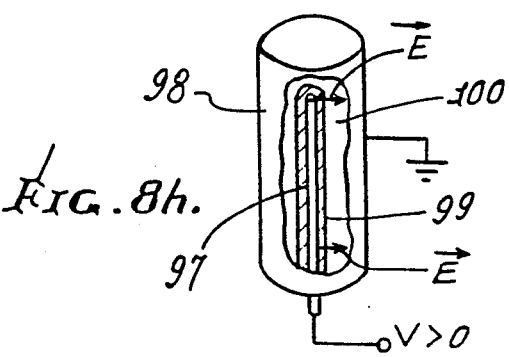

FIG. 8h illustrates, in perspective, a conductive rod or tube 97 projecting axially in a conductive cylinder 98, and forming an electrically controlled condenser-collector or evaporator. Voltage is applied to the rod or tube, and the cylinder is grounded. Liquid refrigerant collects about the rod or tube in the high electric field region, as seen at 99, and vapor is in the space 100 surrounding the liquid outer surface, where the electric field intensity is lower.

Figure 17A:
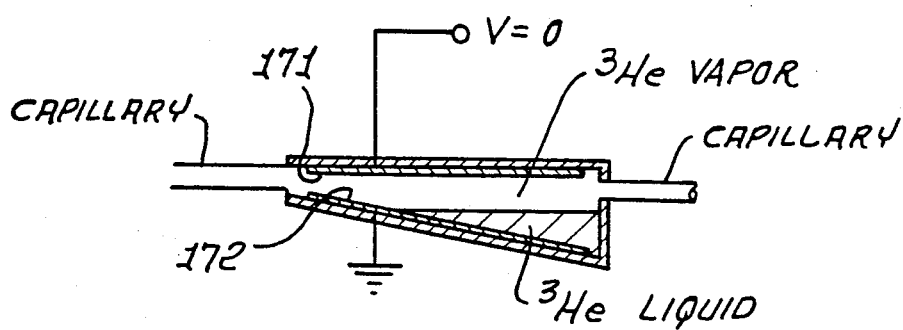
FIGS. 17a and 17b are schematic views showing either an electrically controlled condenser-collector or an electrically controlled evaporator, in earth's gravity, and under zero and greater than zero voltage application, respectively.
Figure 17B:
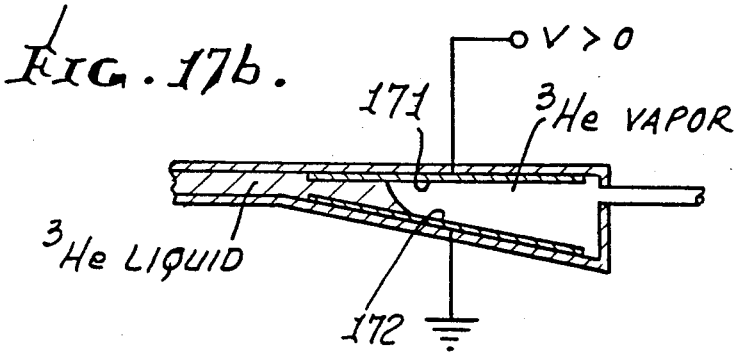
Figure 18A:
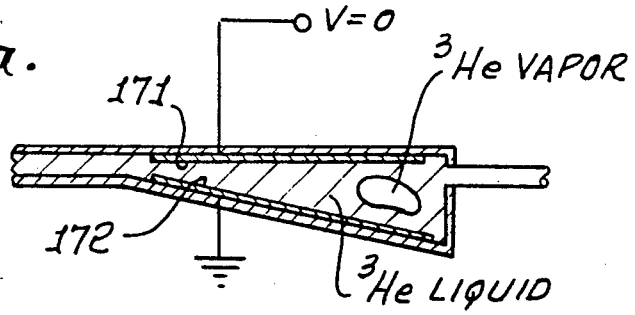
FIGS. 18a and 18b are like FIGS. 17a and 17b, but showing the conditions of the apparatus under microgravity.

FIG. 17a shows the location of liquid in a wedge-shaped electrically controlled condenser-collector, in earth's gravity, with zero voltage applied to plates 171 and 172 (as referred to in FIG. 6). FIG. 17b is like 17a, but shows the liquid position when voltage greater than zero is applied. FIG. 18a is like FIG. 17a, but shows the liquid position in microgravity. FIG. 18g is like FIG. 17b, but shows the liquid position in microgravity. FIGS. 17a, 17b, 18a, and 18b may also be taken to represent conditions in an electrically controlled evaporator provided that the plate labels 171 and 172 are replaced by labels 50 and 51 (as referred to in FIG. 2).

It will be understood that throughout this application, including the claims, the term "electrostatic" refers to either DC or AC voltage conditions.

Typical voltages applied to plates, as seen in FIGS. 2, 6, 8, 17, and 18 are between 100 and 500 volts, d.c. or a.c. (r.m.s.) for operation in microgravity, and between 1,000 and 10,000 volts d.c. or a.c. (r.m.s.) for a horizontally oriented refrigerator on earth.

Because dielectric breakdown limits the lowest temperatures attainable in an electrically controlled evaporator in a horizontally oriented $^3$He evaporation refrigerator operating in earth's gravity, and this may interfere with complete testing of a flight refrigerator on earth, two alternative means for liquid confinement in the evaporator are provided in this invention. One alternative means utilizes capillary confinement alone through use of a porous sponge. The other utilizes a combination of a porous sponge and electrical force means for confining the liquid. These two confinement means are described next.

Figure 9:
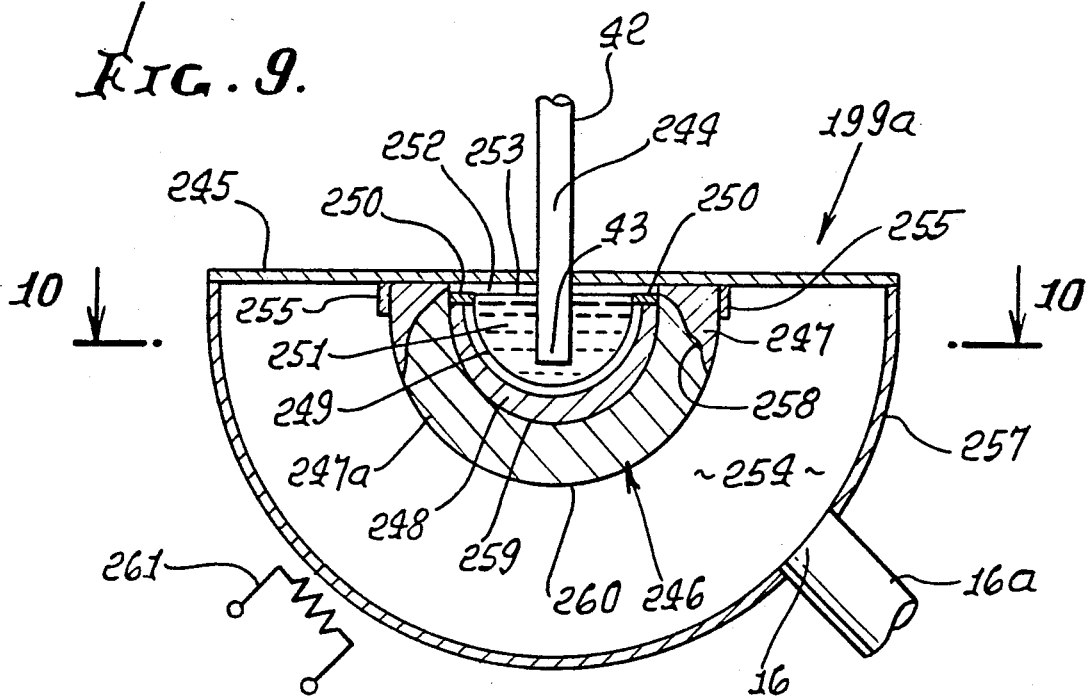
FIG. 9 is a side elevation showing a capillary force controlled, porous sponge evaporator.
Figure 10:
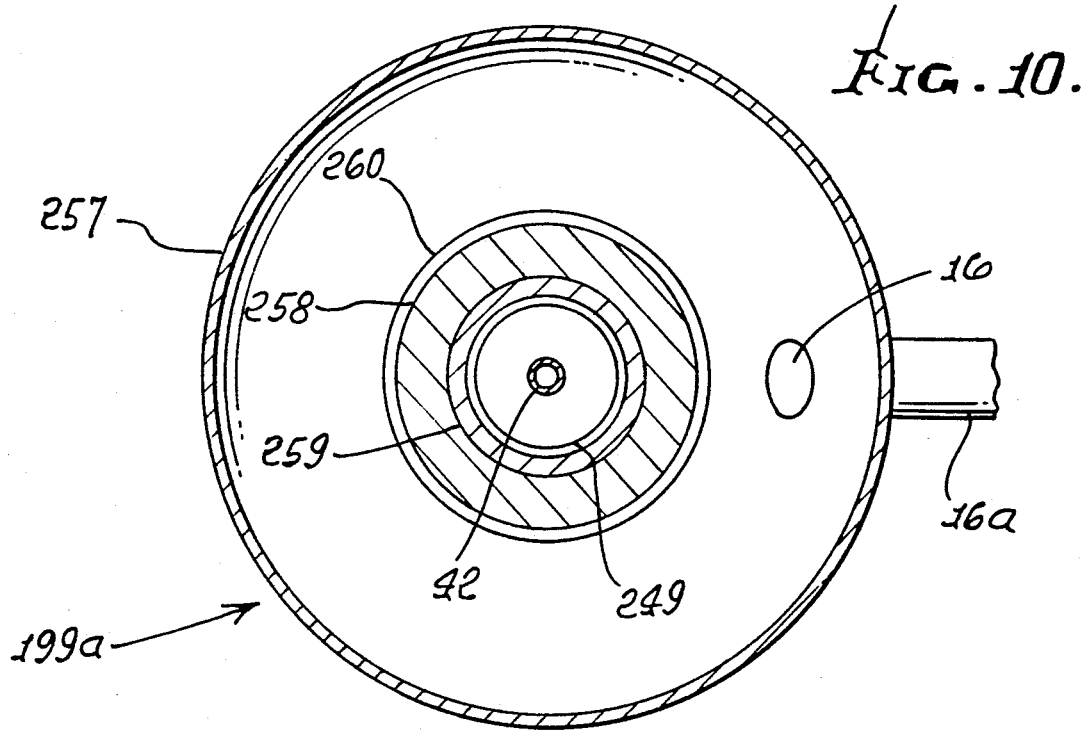
FIG. 10 is a plan view taken on lines 10—10 of FIG. 9.

FIGS. 9 and 10 show an evaporator 199a that utilizes capillary confinement alone for the liquid. The porous sponge 246, which, for example, may be made of a sintered material or made of zeolite, includes a liquid-filled portion 247a and vapor-filled portions 247 and 248. Usable sintered materials include alumina, brass, silver, silver alloy, copper, copper alloy, steel and steel alloy. Liquid 244 enters the evaporator chamber through the capillary 42 at the evaporator inlet 43. The upper boundary of the porous sponge is shaped to provide an inner space, or bowl, 249 to hold liquid refrigerant 251. That inner space is defined next to the upper wall 245 of the evaporator chamber. The bowl is lined, except for a narrow gap next to wall 245, with material impermeable to liquid refrigerant. The upper edge of the bowl liner is joined continuously to a guard ring 250 that is also impermeable to liquid refrigerant. The guard ring extends laterally from the bowl liner. The function of the bowl liner and guard ring is to prevent liquid from filling a portion of the sponge just below the bowl and ring, and to thereby provide a vapor-filled portion 248 of the sponge, in earth's gravity. For a refrigerator operating on earth, the inner space may not be completely filled with liquid, and $^3$He vapor 252 then fills the upper portion of that space, providing a liquid-vapor interface 253. The flow rate of liquid through the capillary and into the evaporator is adjusted so that liquid overflows the lined portion of the bowl, flows onto the top surface of the guard ring, and then flows into the sponge so that it replenishes the liquid 247a in the sponge as liquid is evaporated at the outer surface of the porous sponge 260 due to reduction of pressure by a pump communicating with the evaporator chamber via a $^3$He vapor exhaust duct 16a and evaporator outlet 16. In normal operation of the refrigerator on earth, $^3$He vapor 254 fills the space between the sponge lower surface 260 and the inner surface of the lower wall 257 of the evaporator chamber. As will appear, the liquid-vapor interfaces 258 and 259 that occur in the interior of the sponge are important in confining the liquid in the sponge in earth3 s gravity. An electrical heater 261 in thermal communication with the evaporator lower wall 257 is provided to evaporate excess liquid that may overflow from the sponge and accumulate on the lower wall during start-up of the refrigerator.

For operation of the refrigerator in microgravity, the flow rate of liquid into the evaporator through inlet 43 and the amount of liquid in the evaporator are adjusted so that liquid fills both the bowl and the porous sponge. Evaporation occurs at the outer surface 260 of the sponge during normal operation of the refrigerator. When the sponge is filled in this way, an adverse acceleration of the refrigerator can result in liquid being released from the sponge. However, after a small amount of liquid has been released, vapor space or spaces will be created in the sponge, and capillary forces will prevent further release, provided that the liquid flow rate into the evaporator chamber through the inlet remains constant and provided the adverse acceleration remains below a certain threshold value. Fine control of the amount of liquid in the evaporator is necessary to match the cooling power of the evaporator to an attached heat load and to achieve predictable behavior in this porous sponge version of the evaporator. To prevent excess release of liquid from the sponge under conditions of acceleration parallel to the plane of the upper wall 245 of the evaporator chamber, a portion 255 of the outer surface of the sponge is covered with a barrier impermeable to liquid refrigerant.

Release of liquid from the sponge under adverse acceleration in space can be avoided by adjusting the amount of liquid in the sponge so that under zero acceleration, the outermost interface between liquid and vapor is located completely in the interior of the sponge. An adverse acceleration will then redistribute the liquid and vapor inside the sponge in a configuration qualitatively resembling that shown in FIG. 9 for an evaporator in earth's gravity, and the liquid will be confined in the sponge by capillary forces. In this mode of operation, for a given attached heat load, the temperature of the evaporator is higher than the lowest temperature attainable by the evaporator. For some cooling applications, this will be satisfactory.

Figure 11:
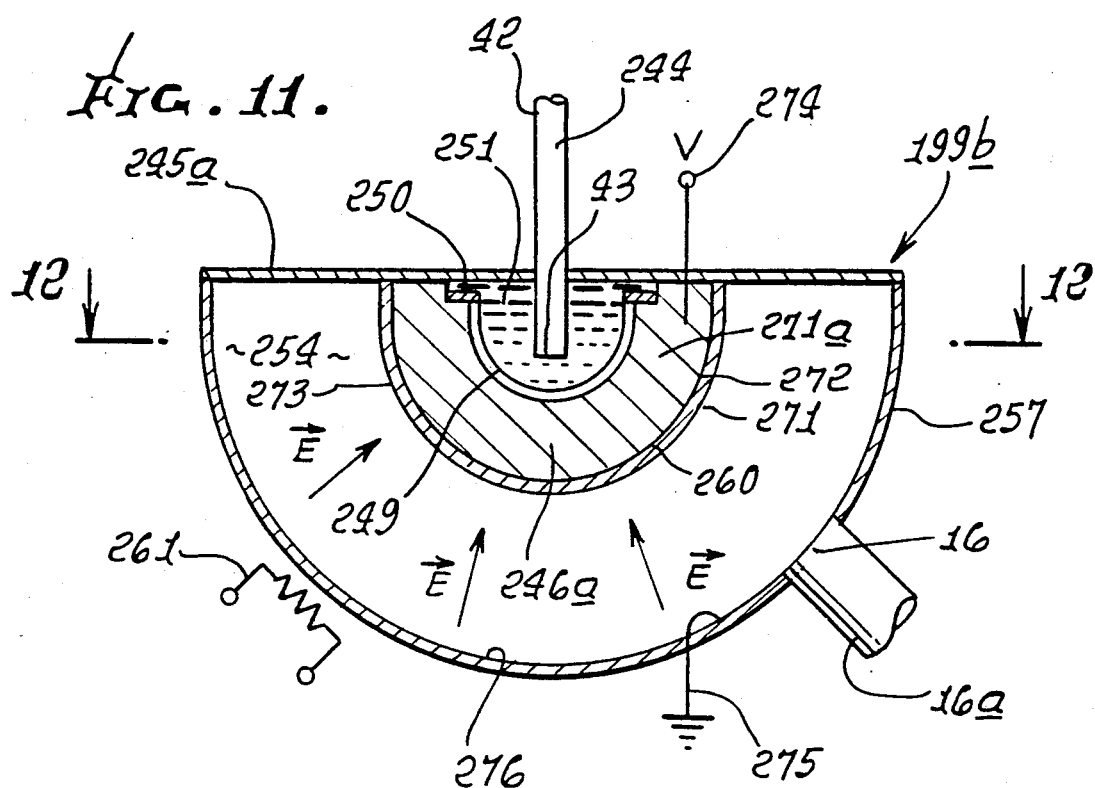
FIG. 11 is a side elevation showing a combination porous sponge-electrical force controlled evaporator.
Figure 12:
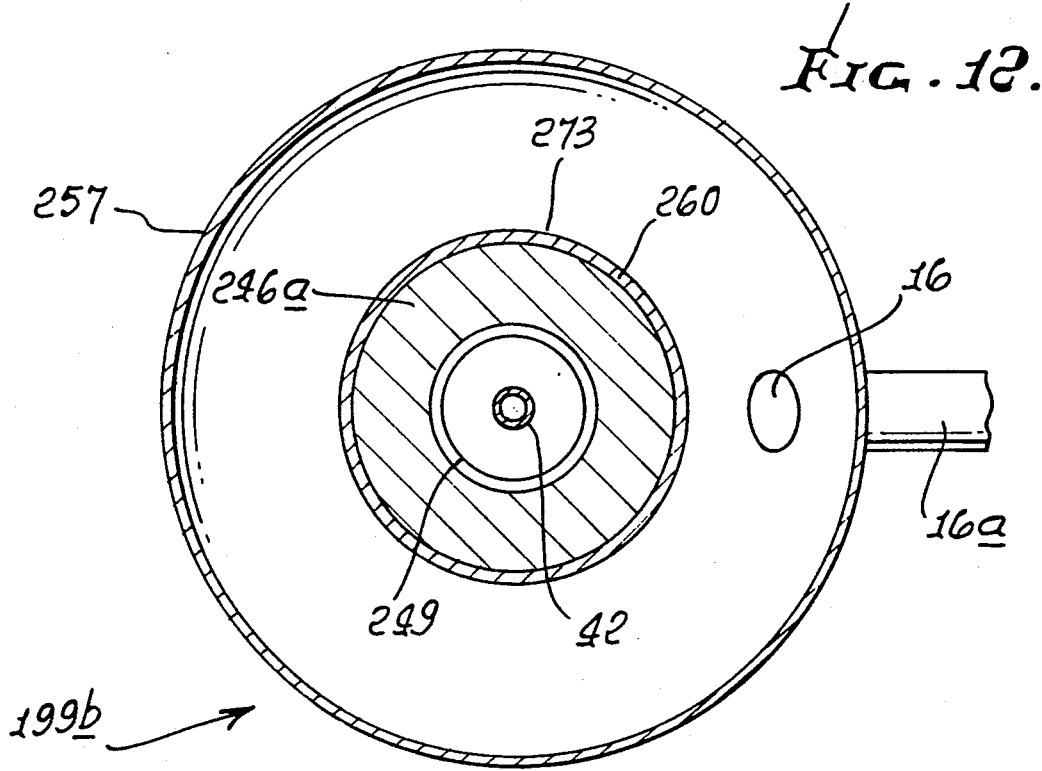
FIG. 12 is a plan view taken on lines 12—12 of FIG. 11.

FIGS. 11 and 12 show an evaporator 199b that utilizes a combination of a porous sponge and electrical force means for confining the liquid. The locations of liquid and vapor shown in these two figures are for microgravity condition. Many of the components are the same as in the porous sponge evaporator in FIGS. 9 and 10 and the same number labels are used for those common parts. A porous sponge 246a, indicated by cross-hatching, is made of electrically conductive material, for example, sintered copper. Other sintered metallic materials include brass, silver, silver alloy, copper alloy, steel, and steel alloy. The inner surface 276 of the lower wall 257 of the evaporator chamber is coated with electrically conductive material. That lower wall is held apart from the porous sponge by an electrically insulative upper wall 245a of the evaporator chamber. A voltage source 274 is connected to the sponge, and the conductive surface 276 is grounded at 275. This arrangement produces an electric field $\bar{E}$ having non-uniform intensity, with greatest field intensity at the sponge outer surface 260 and lowest field intensity at the surface 276. There is negligible electric field within the sponge itself.

The bowl 249 is completely filled with liquid ³He 251, and the porous sponge 246a is completely filled with liquid ³He 271a, in normal operation in microgravity. The amount of liquid in the evaporator chamber is adjusted so that there is more than enough to fill the bowl and the sponge. The excess liquid ³He accumulates as a bulk liquid layer 271 at the sponge outer surface 260 due to its relatively high dielectric constant and the high electric field there. Vapor 254, having relatively low dielectric constant, occupies other regions, more distant from the sponge surface, where the electric field intensity is lower. The liquid layer 271 has an interface 272 with the liquid inside the sponge. A liquid-vapor interface 273 occurs at the outer boundary of that liquid layer. Evaporation of bulk liquid can occur at the interface 273 when the pressure of vapor 254 is reduced due to pumping.

This electrode arrangement provides confinement of the liquid even under adverse accelerations. This arrangement also permits evaporation at the interface 273 between the bulk liquid and the vapor under microgravity conditions, and thereby reduces the minimum temperature attainable by the refrigerator with a given attached heat load, in microgravity. About the same low temperature can be reached for a range of thicknesses of the liquid layer 271, and this simplifies control of the refrigerator to match the cooling power to the attached heat load.

On earth, even when the voltage across the electrodes is zero, the liquid refrigerant will tend to accumulate at the bottom of the porous sponge due to gravitational forces. Just as for the evaporator in FIGS. 9 and 10 using a porous sponge alone, to observe the useful confinement properties of liquid, the evaporator should be oriented so that the liquid refrigerant in the bowl is above the outer boundary 260 of the porous sponge, where liquid can evaporate most easily. Evaporation of liquid at that sponge boundary 260 is nearly as effective in producing cooling as evaporation at the surface of bulk liquid. For applied voltages greater than zero, a thin liquid film can form on the bottom of the sponge, like 271, but confined to only part of the sponge outer surface. Evaporation at the outer surface of that film will produce only slightly greater cooling power than when the film is absent. On earth, the combination of the sponge, bowl with liner, and guard ring aided by gravitational force provides means for reducing the lowest temperature attainable by a refrigerator with a given attached heat load. Either with or without the application of electric field the lowest temperature attainable by the refrigerator on earth, with the given heat load, will almost equal the lowest temperature attainable by that refrigerator utilizing an electric field and operating in microgravity.

Figure 16:
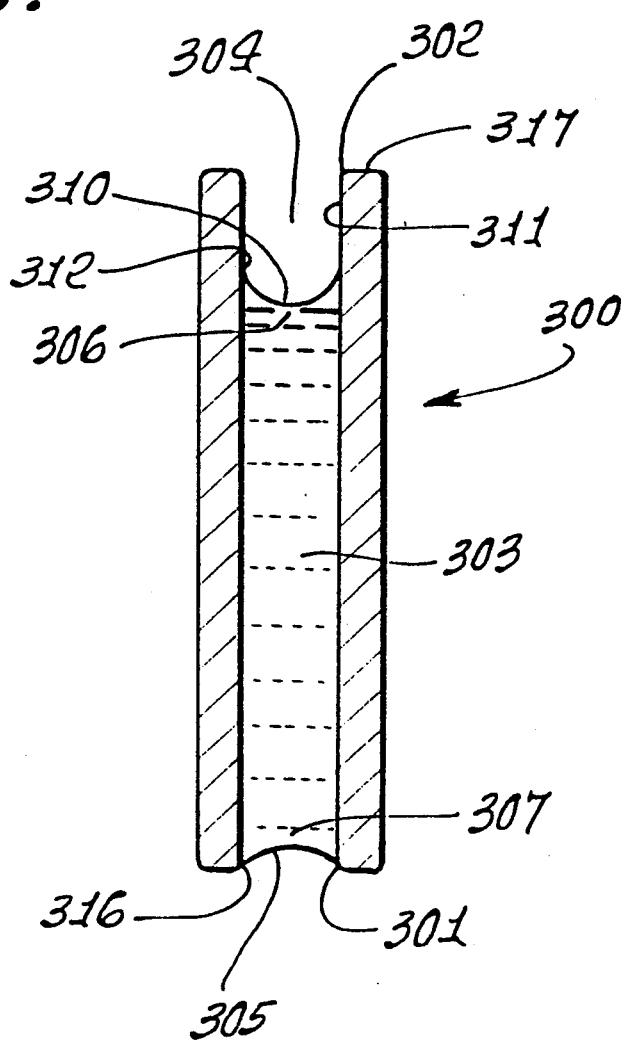
FIG. 16 is a schematic view showing a liquid column confined by capillary forces in a cylindrical tube in earth's gravity, and qualitatively illustrating the liquid confinement principles used in a porous sponge evaporator.

The principles involved in confining the liquid in the sponge assisted by the bowl with liner and the guard ring, in earth's gravity or under adverse acceleration in space, can be understood with the aid of FIG. 16. The principles are more readily illustrated using a capillary tube rather than a porous sponge, but the basic mechanisms producing confinement are the same as in a sponge.

Referring to FIG. 16, a cylindrical capillary tube 300 is penetrated along its axis by a hole or bore 304, the inner radius being $r_1$. The edges 301 and 302 of the tube at its opposite ends are rounded. The hole 304 is partly filled with liquid 303. ³He wets the interior wall or walls of the tube, and the contact angle between the liquid surface and the tube wall is zero. Then the liquid surface 310 is, to good approximation, a hemisphere that is tangent to the tube wall surface 311 along the horizontal circle intersecting the plane of the figure at 312. ³He vapor fills the unshaded regions shown in FIG. 16, and the pressure $p_v$ is about that of the saturated vapor throughout the vapor filled regions when there is no pumping action. Laplace's formula applied to this hemispherical surface gives the result that the pressure $p_1$, in the liquid at 306 just below the surface 310, is given $$p_1 = p_v - \frac{2\gamma}{r_1}$$

where $\gamma$ the surface tension.

For a particularly stable metastable state of liquid confinement, the liquid column lower surface 305 is tangent to the tube wall along a horizontal circle that intersects the plane of the figure at 316. To good approximation, the lower liquid surface 305 is a portion of a sphere. Because the edge 301 of the tube is rounded, that sphere portion has a radius $r_2$ such that $r_2$ is greater that $r_1$. The pressure $p_2$, at 307 just inside the liquid surface 305, is related to $r_2$ by Laplace's formula as follows:

$$p_2 = p_v - \frac{2\gamma}{r_2}$$

The pressure difference $p_2 - p_1$ balances the hydrostatic pressure difference between points 306 and 307, separated by height "h", say. Therefore, $$p_2 - p_1 = 2\gamma \left( \frac{1}{r_1} - \frac{1}{r_2} \right) = \rho g h,$$

where $\rho$ is the density of the liquid and g is gravitational acceleration at the earth's surface (or the magnitude of an adverse acceleration in space). The formula shows that the pressure difference that balances the weight of the liquid per unit cross-sectional area of the liquid column depends on the different radii of curvature at the top and bottom surfaces of the liquid.

The radius of the upper liquid surface is fixed at $r_1$ for all positions of the surface far from the upper end of the tube where the edge 302 of the tube is rounded. If the height "h" of the liquid column is increased by adding liquid in the tube, the radius $r_2$ of the lower liquid surface 305 increases until the surface is flat and $r_2$ is infinite. The value of $r_2$ can change to meet the support requirements of different liquid column heights as a result of the liquid lower surface moving slightly up or down. That displacement of the lower surface causes the liquid lower surface to make contact with the tube wall at slightly different positions where the tube edge is rounded.

If the upper end 317 were attached to the bottom of a liquid reservoir so that liquid could fill the tube from the top, the radius $r_1$ would then be determined by the surface of the liquid in the reservoir, and $r_1$ would be so large that it could be taken as infinite. The quantity $$2\gamma\left(\frac{1}{r_1} - \frac{1}{r_2}\right)$$

would be negative or zero, and capillary forces could not support a column of liquid of any height in the metastable state of confinement considered here. This explains the importance of having a liquid-vapor interface inside the capillary tube if capillary forces are to support a column of liquid in a relatively highly stable metastable state. The geometry is more complicated and less well-defined inside a porous sponge, but this principle is also applicable there. This explains the importance of the liquid-vapor interfaces inside the porous sponge in FIGS. 9 and 11. The bowl with liner and the guard ring in FIGS. 9 and 11 help create conditions where a liquid-vapor interface occurs inside the sponge.

It is noted here that there are sometimes other states of liquid confinement in a porous sponge that can be established without the use of a bowl with liner and a guard ring. Those states are characterized by liquid bulging from the bottom of a pore to form a pendant drop or an incipient pendant drop. These states are generally less stable than the metastable state described in connection with FIG. 16, and in some cases they release liquid from the sponge spontaneously, although sometimes very slowly. For these and other reasons they are less satisfactory states for use in confining liquid in an evaporator, although they are not ruled out completely.

Use of a porous sponge made of sintered metal with high thermal conductivity, such as copper, tends to equalize the temperature throughout the sponge. This tends to suppress boiling of liquid in the interior of the sponge. Boiling in the interior is most likely to occur at high heat loads; so a metal sponge is especially advantageous under those conditions. Boiling liquid from the interior of the sponge would degrade the efficiency of the evaporator.

A variable flow impedance 41, in a liquid flow path, and a second variable flow impedance 241, in a vapor flow path, are shown in FIG. 1. A design for a variable flow impedance device 400, subject to active control using a stack of piezoelectric plates, is shown in FIGS. 13, 14, and 15. Fluid enters the device through duct 409 at an inlet 410 to a chamber 402. Fluid 413 in the chamber exits through outlet 412 into duct 411. The chamber 402 has a rigid bottom wall defined by the upper surface of the lower plate 403. The chamber 402 has a top wall defined by a flexible diaphragm 401, which may be shaped so that the diaphragm can be deformed to function like a bellows, without excessive strain of the diaphragm. The diaphragm 401 is continuously attached to the lower plate 403 along the line 421. A driver rod 408 is attached to the upper surface of the diaphragm. The rod is also attached to the lower surface of a pile of piezoelectric plates 406. The pile of piezoelectric plates is attached to the middle plate 404, the middle plate being rigidly held in its position. A variable voltage source 407 is connected to the piezoelectric pile, and the top of the pile is grounded.

The length of the piezoelectric pile of plates 406 changes in response to voltage changes applied across it. This displacement is communicated via the driver rod to the flexible diaphragm, thereby changing the thickness of a portion of the chamber and consequently changing the impedance of the flow path for fluid moving through the chamber.

An upper plate 405 has a threaded bolt hole 418. An adjustment bolt 417 threads into hole 418 and also bears against the upper surface of the middle plate 404. Plate 404 is supported by assembly bolts 416a, 416b, and 416c with the aid of lower spacer bushings 414a, 414b, and 414c, and also with the aid of upper spacer bushings 415a, 415b, and 415c. The assembly bolts are threaded into hole 419 and two other holes that are symmetrically located. Bolt holes 423a, 423b, and 423c may be either slightly oversized or slightly elongated so that plate 404 can be bent slightly downward by adjustment bolt 417 without straining the middle plate 404 excessively. The adjustment bolt allows the thickness of a portion of chamber 402 to be set after the device has been cooled. This is necessary because components of the device have different thermal expansion coefficients and because the thickness of chamber 402 is very small. The change in length of a pile of piezoelectric plates can typically be varied from zero to a maximum of about 200 microns in response to voltage variation. To change the flow impedance of the device significantly, the thickness of chamber 402 must be about this magnitude also. The middle plate 404 has a relatively thick inner portion, bounded by the circle 422. This thick portion provides solid support for the piezoelectric plates. The flexible mounting tabs 420a, 420b, and 420c also function as flat springs.

Referring again to FIG. 1, the heat reservoirs can be cold plates cooled by liquid <He stored in a cryostat or by other refrigerator stages, for example.

The heat switches can be mechanical switches or gas gap switches, for example.

Referring again to FIGS. 4 and 5 and the description thereof, the valve seat may be regarded as consisting of relatively soft material, such as soft metal selected from the group consisting of gold, gold alloy, indium, indium alloy, platinum, and platinum alloy.

The stopper surface portion engaging the seat may be regarded as consisting of relatively hard material, such as sapphire, alnico, or a hard metal selected from the group consisting of steel and steel alloys.

This basic design for an evaporation refrigerator could also be used with other working fluids, such as nitrogen or oxygen, for operation in other temperature ranges. For example, if nitrogen were used instead of $^3$He, the condenser-collector and evaporator temperatures could be somewhere between the critical value of 126.1K and the triple point value of about 63.1K; the evaporator must be at a lower temperature than the condenser-collector, of course. The heat reservoirs must be at correspondingly higher temperatures. In some of the higher temperature ranges, the solenoid valves would utilize normal conductors rather than superconductors in their windings. Check valves without solenoid assists could be used instead of solenoid valves in those instances where the pressure differences are sufficient to allow them to operate in a satisfactory manner. Refrigerants contemplated include $^3$He, $^4$He, $H_2$, Ar, Ne, Kr, Xe, $O_2$, $N_2$, and freon or mixtures of two or more of these.

This invention embodies a complete system for a continuously operating $^3$He evaporation refrigerator that can function in a microgravity environment. The method of pumping liquid from one vessel to another (in this invention, from the condenser-collector to the evaporator) using a combination of saturated vapor pressure as a driving force and an electric field to position the liquid at the inlet to a capillary is highly advantageous, as are the electrostatic, porous sponge, and combination electrostatic and porous sponge versions of the evaporator. Provision of several means for matching the cooling power of the refrigerator to an attached heat load is also highly advantageous.

A highly valuable feature of this invention is that it can be arranged to operate in a horizontal orientation in earth's gravity so that all of the controls for positioning the liquid and vapor phases can be tested on the ground in a flight version of the refrigerator. This increases its reliability.

I claim:

1. In a liquid refrigerant evaporation refrigerator, the combination comprising
   a) an evaporator including means to position liquid and vapor phases in selected locations while allowing evaporation of liquid to occur in normal operation, there being a refrigerant flow path inlet to the evaporator,
   b) two adsorption pumps connected via vent ducts with the evaporator to receive refrigerant vapor, alternately, there being valve means associated with each pump,
   c) heater means associated with the pumps to cause refrigerant desorption by the pumps,
   d) a condenser-collector to receive desorbed refrigerant, and means for producing electric forces to hold refrigerant liquid at a flow path outlet from the condenser-collector,
   e) a liquid refrigerant flow path between the condenser-collector and the evaporator.

2. The combination of claim 1 wherein said refrigerant is $^3$He.

3. The combination of claim 1 wherein said a) means to position liquid and vapor phases in selected locations is
   an electric force producing means.

4. The combination of claim 1 wherein said valve means comprises valves that include annular seats and stoppers having ball surface portions that move toward and away from the seats in response to solenoid produced magnetic field variation.

5. The combination of claim 4 including a spring to assist stopper movement in at least one direction.

6. The combination of claim 5 wherein the seats consist of a relatively soft material.

7. The combination of claim 6 wherein said soft material is a soft metal selected from the group that consists of gold, gold alloy, indium, indium alloy, silver, silver alloy, platinum, and platinum alloy.

8. The combination of claim 5 wherein portions of the stoppers are magnetized and have permanent magnetic moments.

9. The combination of claim 5 wherein portions of the stoppers consist of ferromagnetic material.

10. The combination of claim 5 wherein portions of the stoppers consist of superconducting material that is diamagnetic.

11. The combination of claim 5 wherein solenoid means is provided to consist of superconducting material to reduce resistive heating of the solenoid means windings.

12. The combination of claim 5 wherein said ball surface portions of the stoppers are made of relatively hard material.

13. The combination of claim 12 wherein said hard material is selected from the group consisting of
    i) steel
    ii) steel alloy
    iii) alnico
    iv) sapphire.

14. The combination of claim 4 wherein the seats consist of a relatively soft material.

15. The combination of claim 14 wherein said soft material is a soft metal selected from the group that consists of gold, gold alloy, indium, indium alloy, silver, silver alloy, platinum, and platinum alloy.

16. The combination of claim 4 wherein portions of the stoppers are magnetized and have permanent magnetic moments.

17. The combination of claim 4 wherein portions of the stoppers consist of ferromagnetic material.

18. The combination of claim 4 wherein portions of the stoppers consist of superconducting material that is diamagnetic.

19. The combination of claim 4 wherein said ball surface portions of the stoppers are made of relatively hard material.

20. The combination of claim 19 wherein said hard material is selected from the group consisting of
    i) steel
    ii) steel alloy
    iii) alnico
    iv) sapphire .

21. The combination of claim 4 wherein the seats consist of gold and portions of the stoppers are attracted or repelled by a magnetic field.

22. The combination of claim 4 wherein solenoid means is provided to consist of superconducting material to reduce resistive heating of the solenoid means windings.

23. The combination of claim 1 wherein there is a well-defined interface established between the liquid and vapor phases in the condenser-collector.

24. The combination of claim 23 wherein the saturated vapor pressure at the liquid-vapor interface is utilized to drive the liquid through the flow path from the condenser-collector to the evaporator.

25. The combination of claim 24 including a heat reservoir, and a thermal impedance between the condenser-collector and the heat reservoir.

26. The combination of claim 25 including a heater means for changing the temperature of the condenser-collector, thereby adjusting the saturated vapor-pressure in the condenser-collector, to help control the rate of flow of liquid from the condenser-collector to the evaporator.

27. The combination of claim 1 wherein there is a well-defined interface established between the liquid and vapor phases in the evaporator.

28. The combination of claim 1 wherein said means for producing electric forces to hold refrigerant liquid at a flow path outlet from the condenser-collector includes
    electrical conductors having diverging surfaces and held at different electrical potentials.

29. The combination of claim 1 wherein the condenser-collector in subparagraph d) includes apparatus for generating a non-uniform electric field with its greatest field intensity in the vicinity desired for a refrigerant liquid phase, having relatively high dielectric constant, and a lower field intensity in the vicinity desired for a refrigerant vapor phase, having relatively low dielectric constant, under microgravity conditions.

30. The combination of claim 1 including means for adjusting said electric heaters located in heating relation with the pumps, to help match the cooling power of the evaporator with a heat load, for steady state operation.

31. The combination of claim 1 including a heat switch means, for connecting each said adsorption pump to a thermal reservoir during the stage in which a pump adsorbs refrigerant, and for disconnecting a pump from the thermal reservoir during refrigerant desorption by the pump.

32. The combination of claim 1 including a controller for the subparagraph c) heater means to adjust the refrigerant desorption or adsorption rate or rates at the pump or pumps.

33. The combination of claim 32, including a thermal impedance in series with a heat switch, or a heat switch system, for effecting elevation of the temperature of either adsorption pump above the temperature of the thermal reservoir when the switch is closed, to efficiently control the adsorption rate of refrigerant at the pump.

34. The combination of claim 1 including a heat reservoir in thermal communication with the condenser-collector.

35. The combination of claim 1 wherein flow path communication between the condenser-collector and the evaporator comprises a capillary or capillaries.

36. The combination of claim 35 including means to subject liquid in the capillary or capillaries to electric forces acting to suppress bubble formation in the flow path.

37. The combination of claim 1 including means to be cooled, thermally coupled to the evaporator.

38. The combination of claim 1 wherein the flow path passes through a heat exchanger that is in thermal communication with a vent duct from the evaporator.

39. The combination of claim 1 wherein the flow path passes through a flow impedance.

40. The combination of claim 39 including means to vary said flow impedance to help control the rate of flow of liquid to the evaporator.

41. The combination of claim 40 wherein said means to vary said flow impedance includes a deformable diaphragm that enables changes in the dimensions of a portion of a flow path for liquid in response to a variable force applied by a force producing means.

42. The combination of claim 41 including a controller for said force producing means.

43. The combination of claim 41 wherein said force producing means includes
a piezoelectric plate.

44. The combination of claim 41 wherein said force producing means includes a pile of piezoelectric plates.

45. The combination of claim 41 wherein said force producing means includes magnetic field producing means.

46. The combination of claim 41 wherein said force producing means includes a combination of piezoelectric plate means and magnetic field producing means.

47. The combination of claim 39 wherein the flow path passes through a second flow impedance located in the path near an inlet to the evaporator.

48. The combination of claim 1 wherein the cooling power of the refrigerator is matched to the load to be cooled, and including said load thermally coupled to the evaporator.

49. The combination of claim 1 wherein said means to position liquid and vapor phases in the evaporator, in subparagraph a), is an electric force producing means having electrical conductors with diverging surfaces, which are curved, said conductors maintained at different electrical potentials.

50. The combination of claim 1 wherein said means to position liquid and vapor phases in the evaporator, in subparagraph a), is an electric force producing means having electrical conductors with concentric curved surfaces having different radii of curvature, and which are maintained at different electrical potentials.

51. The combination of claim 1 wherein said means to position liquid and vapor phases in the evaporator, in subparagraph a), is an electric force producing means having electrical conductors maintained at different electrical potentials and producing non-uniform electrical fields near edges of said conductors.

52. The combination of claim 1 wherein said means to position liquid and vapor phases in the evaporator, in subparagraph a), includes apparatus for generating a non-uniform electric field with its greatest field intensity in the vicinity desired for a refrigerant liquid phase, having relatively high dielectric constant, and a lower field intensity in the vicinity desired for a refrigerant vapor phase, having relatively low dielectric constant, under microgravity conditions.

53. The combination of claim 1 wherein said means to position liquid and vapor phases in the evaporator, in subparagraph a), is a porous sponge.

54. The combination of claim 68 wherein said porous sponge is selected from the group consisting of:
 i) sintered material
 ii) zeolite.

55. The combination of claim 54 wherein said sintered material is copper.

56. The combination of claim 54 wherein said sintered material is copper alloy.

57. The combination of claim 54 wherein said sintered material is steel.

58. The combination of claim 54 wherein said sintered material is steel alloy.

59. The combination of claim 54 wherein said sintered material is brass.

60. The combination of claim 54 wherein said sintered material is silver.

61. The combination of claim 54 wherein said sintered material is silver alloy.

62. The combination of claim 53 wherein said porous sponge is made of electrically conducting material.

63. The combination of claim 62 wherein a portion of said porous sponge is a shell.

64. The combination of claim 63 wherein said porous sponge has an inner surface, a portion of which contains a liner shell made of material essentially impermeable to said refrigerant.

65. The combination of claim 64 wherein said liner shell is at least partly filled with liquid refrigerant.

66. The combination of claim 64 including an annular guard ring made of material essentially impermeable to said refrigerant, said ring joined continuously at its inner edge to an edge of said liner shell.

67. The combination of claim 66 wherein said liner shell is at least partly filled with liquid refrigerant.

68. The combination of claim 63 including an electrical conductor having a shell surface portion at least approximately concentric with the shell surface portion of the porous sponge, the two shell surface portions held apart by electrically insulating members.

69. The combination of claim 68 wherein said two shell surface portions are maintained at different electrical potentials.

70. The combination of claim 69 wherein liquid refrigerant is held at the outer surface of the porous sponge shell by electrical forces.

71. The combination of claim 68 including a means for varying the voltage applied across the conductors at the evaporator.

72. The combination of claim 63 wherein a portion of said shell is spherical.

73. The combination of claim 63 wherein a portion of said shell is approximately spheroidal.

74. The combination of claim 54 wherein said sintered material is
   alumina.

75. The combination of claim 53 wherein a portion of said porous sponge is a shell.

76. The combination of claim 75 wherein said porous sponge has an inner surface, a portion of which contains a liner shell made of material essentially impermeable to said refrigerant.

77. The combination of claim 76 including an annular guard ring made of material essentially impermeable to said refrigerant, said ring joined continuously at its inner edge to an edge of said liner shell.

78. The combination of claim 77 wherein said liner shell is at least partly filled with liquid refrigerant.

79. The combination of claim 76 wherein said liner shell is at least partly filled with liquid refrigerant.

80. The combination of claim 75 wherein a portion of said shell is spherical.

81. The combination of claim 75 wherein a portion of said shell is approximately spheroidal.

82. The combination of claim 1 wherein said evaporator has bowl shape, and contains a porous metallic material.

83. The combination of claim 1 including a heater means at the evaporator for eliminating liquid from undesired regions by evaporating it during start-up of the refrigerator.

84. The combination of claim 1 including variable flow impedance in the vapor flow path between the evaporator and said valve means associated with each pump.

85. The combination of claim 84 wherein said variable flow impedance means in the vapor flow path includes a deformable diaphragm that enables changes in the dimensions of a portion of said vapor flow path in response to a force applied by a force producing means.

86. The combination of claim 85 wherein said force producing means includes
   a piezoelectric plate.

87. The combination of claim 85 including a controller for said force producing means.

88. The combination of claim 85 wherein said force producing means includes a pile of piezoelectric plates.

89. The combination of claim 85 wherein said force producing means includes magnetic field producing means.

90. The combination of claim 85 wherein said force producing means includes a combination of piezoelectric plate means and magnetic field producing means.

91. The combination of claim 1 wherein said refrigerant is selected from the group consisting of:
   i) $^4$He
   ii) $H_2$
   iii) Ar
   iv) Ne
   v) Kr
   vi) Xe
   vii) $N_2$
   ix) $O_2$.

92. The combination of claim 1 wherein said refrigerant is selected from the group consisting of:
   i) $^3$He
   ii) $^4$He
   iii) $H_2$
   iv) Ar
   v) Ne
   vi) Kr
   vii) Xe
   viii) $N_2$
   ix) $O_2$
   x) Freon,
this refrigerant being a mixture.

93. The combination of claim 1 wherein said a) means to position liquid and vapor phases in selected locations is a combination of electric force producing means and gravitational force means.

94. The combination of claim 1 wherein said a) means to position liquid and vapor phases in selected locations is a capillary force producing means.

95. The combination of claim 1 wherein said a) means to position liquid and vapor phases in selected locations is a combination of a capillary force producing means and gravitational force means.

96. The combination of claim 1 wherein said a) means to position liquid and vapor phases in selected locations is a combination of electric force producing means and capillary force producing means.

97. The combination of claim 1 wherein said a) means to position liquid and vapor phases in selected locations is a combination of electric force producing means and capillary force producing means and gravitational force means.

98. The combination of claim 1 wherein said means for producing electric forces to hold refrigerant liquid at a flow path outlet from the condenser-collector includes electrical conductors having curved conducting surfaces which are concentric and have different radii of curvature, said conductors held at different electric potentials.

99. The combination of claim 1 wherein said means for producing electric forces to hold refrigerant liquid at a flow path outlet from the condenser-collector includes conductors which are electrically charged to form fringing electrical fields near the edges of the conductors, said conductors held at different electrical potentials.

100. The combination of claim 1 wherein said means to position liquid and vapor phases in the evaporator, in subparagraph a), is an electric force producing means having electrical conductors with diverging surfaces, which are flat, said conductors maintained at different electrical potentials.

101. The combination of claim 1 wherein said means to position liquid and vapor phases in the evaporator, in subparagraph a), is an electric force producing means having electrical conductors with diverging surfaces, which have flat portions, said conductors maintained at different electrical potentials.

102. The combination of claim 1 wherein said means to position liquid and vapor phases in the evaporation, in subparagraph a), is a capillary force producing means comprising a porous sponge.

103. The combination of claim 102 wherein said capillary force producing means includes a liquid-vapor interface in the interior of said porous sponge, said interface being separated, in earth's gravity, by a liquid-filled portion of the porous sponge from a second liquid-vapor interface, where evaporation occurs, which is closer to the outer surface of the porous sponge.

104. The combination of claim 1 wherein said means to position liquid and vapor phases in the evaporator, in subparagraph a), is a combination of gravitational force and a porous sponge.

105. The combination of claim 104 wherein said porous sponge includes a liquid-vapor interface in the interior of said sponge, said interface being separated, in earth's gravity, by a liquid-filled portion of the porous sponge from a second liquid-vapor interface, where evaporation occurs, which is closer to the outer surface of the porous sponge.

106. The combination of claim 1 including means operatively coupled in heat transfer relation with the refrigerant passed to the condenser-collector.

107. In an evaporation refrigerator, the combination comprising
  a) a refrigerant reservoir chamber containing liquid and vapor refrigerant, and means for producing electric forces to hold liquid refrigerant at a flow path outlet from the chamber,
  b) an evaporator chamber connected with the refrigerant reservoir chamber by said flow path, said evaporator chamber having a flow path inlet,
  c) pump means connected with said evaporator chamber to remove refrigerant vapor from the evaporator chamber,
  d) and, in the evaporator chamber, apparatus including means for confining liquid refrigerant in a location near said flow path inlet to the evaporator chamber, and said apparatus allowing evaporation of refrigerant from the evaporator chamber during normal operation of the refrigerator.

108. The combination of claim 107 wherein said flow path passes through a flow impedance.

109. The combination of claim 107 including means to vary said flow impedance to help control the rate of flow of liquid from said refrigerant reservoir chamber to said evaporator chamber.

110. The combination of claim 108 wherein the flow path passes through a second flow impedance located in the path near an inlet to the evaporator.

111. The combination of claim 107 including a thermal reservoir in thermal communication with the refrigerant reservoir chamber.

112. The combination of claim 111 including a thermal impedance between the refrigerant reservoir chamber and the thermal reservoir.

113. The combination of claim 112 including heater means to elevate the temperature of the liquid in the refrigerant reservoir chamber above the temperature of the thermal reservoir.

114. The combination of claim 113 including a controller for said heater means to vary the temperature of the liquid in the refrigerant reservoir chamber, and in turn the saturated vapor pressure of the liquid, to help control the rate of flow of liquid from the refrigerant reservoir chamber to the evaporator chamber.

115. The combination of claim 107 including means to be cooled, thermally coupled to the evaporator chamber.

116. The combination of claim 107 wherein said d) means comprises a porous sponge.

117. The combination of claim 116 wherein said porous sponge is shaped to define an inner chamber near said flow path inlet to the evaporator chamber.

118. The combination of claim 117 wherein a portion of the surface of said inner chamber contains a liner shell made of material essentially impermeable to said liquid refrigerant.

119. The combination of claim 118 including a guard ring made of material essentially impermeable to said liquid refrigerant, said ring joined continuously at its inner edge to an edge of said liner shell.

120. The combination of claim 118 including a guard apparatus made of material essentially impermeable to said liquid refrigerant.

121. The combination of claim 116 wherein said porous sponge provides a capillary force producing means that includes a liquid-vapor interface in the interior of said sponge, said interface being separated, in earth's gravity, by a liquid-filled portion of the sponge from a second liquid-vapor interface, where evaporation occurs, which is closer to the outer surface of the porous sponge.

122. The combination of claim 107 wherein said d) means comprises an electric force producing means.

123. The combination of claim 107 wherein said d) means comprises a combination of a porous sponge and an electric force producing means.

124. The combination of claim 123 wherein said porous sponge and electric force producing means confine a liquid refrigerant in the evaporator chamber, said electric force producing means including non-uniform electric fields with highest field intensity next to the outside surface of the porous sponge, so that liquid, having higher dielectric constant is held next to said outside surface, and vapor having lower dielectric constant is positioned in other regions outside the porous sponge where the electric field is lower.

125. The combination of claim 123 wherein said porous sponge is shaped to define an inner chamber near said flow path inlet to the evaporator chamber.

126. The combination of claim 125 wherein a portion of the surface of said inner chamber contains a liner shell made of material essentially impermeable to said liquid refrigerant.

127. The combination of claim 126 including a guard apparatus made of material essentially impermeable to said liquid refrigerant.

128. The combination of claim 126 including a guard ring made of material essentially impermeable to said liquid refrigerant, said ring joined continuously at its inner edge to an edge of said liner shell.

129. The combination of claim 123 wherein said porous sponge includes a liquid-vapor interface in the interior of the sponge, said interface being separated, in earth's gravity, by a liquid-filled portion of the porous sponge from a second liquid-vapor interface, where evaporation occurs.

130. The combination of claim 107 wherein said flow path passes through a heat exchanger that is in thermal communication with a vent duct from the evaporator chamber.

131. The combination of claim 107 wherein said refrigerant is selected from the group consisting of:

ii) $^4$He
iii) h$_2$
iv) Ar
v) Ne
vi) Kr
vii) Xe
viii) N$_2$
ix) O$_2$
x) Freon.

132. The combination of claim 107 wherein said refrigerant is selected from the group consisting of:

i) $^3$He
ii) $^4$He
iii) H$_2$
iv) Ar
v) Ne
vi) Kr
vii) Xe
viii) N$_2$
ix) O$_2$
x) Freon, this refrigerant being a mixture.

* * * * *

UNITED STATES PATENT AND TRADEMARK OFFICE
CERTIFICATE OF CORRECTION

PATENT NO. : 5,070,702
DATED : December 10, 1991
INVENTOR(S) : Henry W. Jackson

It is certified that error appears in the above-identified patent and that said Letters Patent is hereby corrected as shown below:

Title page 1, first line of title, "CONTINUOUSLY OPERATING $3^{HE}$" should read --CONTINUOUSLY OPERATING $^3$HE-- page 1, column 1, fifth reference, line 1, "U. B. Israelson, H. W. Jackson, and D. Petrac, "Li-" should read --U. E. Israelson, H. W. Jackson, and D. Petrac. "Li- -- page 1, column 1, seventh reference, line 1, "V. A. Mikheeve, V. A. Maidanov, and N. P. Mikhin," should read --V. A. Mikheev, V. A. Maidanov, and N. P. Mikhin,-- column 1, line 2, "CONTINUOUSLY OPERATING $3^{HE}$" should read --CONTINUOUSLY OPERATING $^3$HE-- column 2, line 34, "neuvering of a spacecraft, for altitude control, for exam-" should read --neuvering of a spacecraft, for attitude control, for exam- -- column 4, line 55, "that an inner space is provided adjacent t the liquid" should read --that an inner space is provided adjacent to the liquid-- column 9, line 31 "ADDITIONAL DESCRIPTION electrical forces" should read --ADDITIONAL DESCRIPTION--

UNITED STATES PATENT AND TRADEMARK OFFICE
CERTIFICATE OF CORRECTION

PATENT NO. : 5,070,702

DATED : December 10, 1991

INVENTOR(S) : Henry W. Jackson

It is certified that error appears in the above-identified patent and that said Letters Patent is hereby corrected as shown below:

Column 9, lines 32 & 33, "localize the liquid in the evaporator when in a microgravity environment as described next." should read --In one embodiment of this invention, electrical forces localize the liquid in the evaporator when in a microgravity environment, as described next.--

Signed and Sealed this

Twenty-seventh Day of October, 1992

Attest:

DOUGLAS B. COMER

Attesting Officer

Acting Commissioner of Patents and Trademarks

UNITED STATES PATENT AND TRADEMARK OFFICE
CERTIFICATE OF CORRECTION

PATENT NO. : 5,070,702

DATED : December 10, 1991

INVENTOR(S) : Henry W. Jackson

It is certified that error appears in the above-identified patent and that said Letters Patent is hereby corrected as shown below:

Title page, first line of title "CONTINUOUSLY OPERATING $3^{HE}$" should read --CONTINUOUSLY OPERATING $^3HE$--

Title page, column 1, fifth reference, line 1, "U. E. Israelson, H. W. Jackson, and D. Petrac, "Li-" should read --U. E. Israelsson, H. W. Jackson, and D. Petrac, "Li- --

Title page, column 1, seventh reference, line 1, "V. A. Mikheeve, V. A. Maidanov, and N. P. Mikhin," should read --V. A. Mikheev, V. A. Maidanov, ind N. P. Mikhin,-- column 1, line 2, "CONTi IUOUSLY OPERATING $3^{HE}$" should read --CONTINUOUSLY OPERATI. G $^3HE$-- column 2, line 34, "neuve. ing of a spacecraft, for altitude control, for exam-" should ead --neuvering of a spacecraft, for attitude control, for exam- -- column 4, line 55, "that an inner space is provided adjacent t the liquid" should read --that an inner space is provided adjacent to the liquid-- column 9, line 31 "ADDITIONAL DESCRIPTION electrical forces" should read --ADDITIONAL DESCRIPTION-- column 9, lines 32 & 33, "localize the liquid in the evaporator when in a microgravity environment as described next." should read --In one embodiment of this invention, electrical forces localize the liquid in the evaporator when in a microgravity environment, as described next.--

UNITED STATES PATENT AND TRADEMARK OFFICE
CERTIFICATE OF CORRECTION

PATENT NO. : 5,070,702

DATED : December 10, 1991

INVENTOR(S) : Henry W. Jackson

Figure 18B:
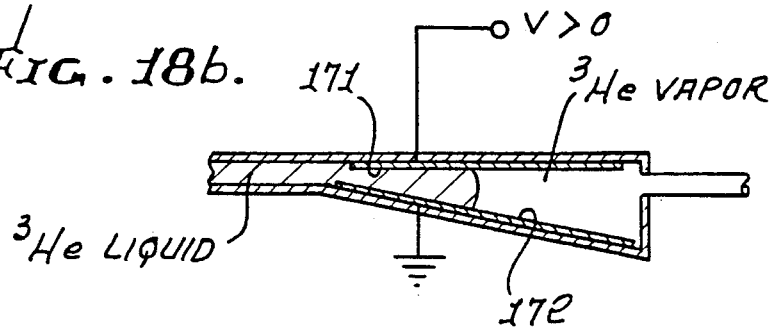

It is certified that error appears in the above-identified patent and that said Letters Patent is hereby corrected as shown below:

column 11, line 16, "172, and an electric field E is produced between 171 and" should read --172, and an electric field $\vec{E}$ is produced between 171 and-- column 11, line 38, "would then be positioned above and below the gate is" should read --would then be positioned above and below the gate in-- column 12, line 49, "The relative dielectric constant of helium≈1, so elec-" should read --The relative dielectric constant of helium≈1, so the elec- -- column 12, line 52, "$\vec{D}=E\epsilon\epsilon\ \vec{E}\approx\epsilon\vec{E}$"
should read --$\vec{D}=\epsilon_o\epsilon_r\ \vec{E}\approx\epsilon_c\vec{E}$,-- column 13, line 13, "liquid position in microgravity. FIG. 18g is like FIG." should read --liquid position in microgravity. FIG. 18b is like FIG.-- column 14, line 11, "sponge in earth3 s gravity. An electrical heater 261 in" should read --sponge in earth's gravity. An electrical heater 261 in-- column 16, line 18, "the liquid at 306 just below the surface 310, is given" should read --the liquid at 306 just below the surface 310, is given by-- column 16, line 24, "where $\gamma$ the surface tension" should read --where $\gamma$ is the surface tension--

UNITED STATES PATENT AND TRADEMARK OFFICE
CERTIFICATE OF CORRECTION

PATENT NO. : 5,070,702
DATED : December 10, 1991
INVENTOR(S) : Henry W. Jackson

It is certified that error appears in the above-identified patent and that said Letters Patent is hereby corrected as shown below:

column 16, line 32, "that $r_1$. The pressure $p_2$, at 307 just inside the liquid" should read --than $r_1$. The pressure $p_2$, at 307 just inside the liquid-- column 18, line 33, "cold plates cooled by liquid <He stored in a cryostat or" should read --cold plates cooled by liquid $^4$He stored in a cryostat or-- column 19, line 41, "is" should read --is an electric force producing means.-- column 19, line 42, delete "an electric force producing means."

column 20, line 62, "cludes" should read --cludes electrical conductors having diverging surfaces and held at different electrical potentials-- column 20, lines 63 & 64, delete "electrical conductors having diverging surfaces and held at different electrical potentials."

column 21, line 54, "producing means includes" should read --producing means includes a piezoelectric plate.-- column 21, line 55, delete "a piezoelectric plate."

column 22, line 33, "54. The combination of claim 68 wherein said porous" should read --54. The combination of claim 53 wherein said porous--

UNITED STATES PATENT AND TRADEMARK OFFICE
CERTIFICATE OF CORRECTION

PATENT NO. : 5,070,702

DATED : December 10, 1991

INVENTOR(S) : Henry W. Jackson

It is certified that error appears in the above-identified patent and that said Letters Patent is hereby corrected as shown below:

column 23, line 10, "71. The combination of claim 68 including a means" should read --71. The combination of claim 69 including a means-- column 23, line 18, "material is" should read --material is alumina.-- column 23, line 19, delete "alumina."

column 23, line 55, "producing means includes" should read --producing means includes a piezoelectric plate.-- column 23, line 56, delete "a piezoelectric plate."

column 24, line 8, "ix) $O_2$" should read -- viii) $O_2$-- column 25, line 46 "109. The combination of claim 107 including means to" should read --109. The combination of claim 108 including means to-- column 27, line above line 1, immediately above "ii) $^4He$" insert --i) $^3He$-- column 27, line 2, "iii) $h_2$" should read --iii) $H_2$--

UNITED STATES PATENT AND TRADEMARK OFFICE
CERTIFICATE OF CORRECTION

PATENT NO. : 5,070,702
DATED : December 10, 1991
INVENTOR(S) : Henry W. Jackson It is certified that error appears in the above-identified patent and that said Letters Patent is hereby corrected as shown below:

In Official Gazette for December 10, 1991, page 631, under "5,070,702" "CONTINUOUSLY OPERATING $3^{HE}$ EVAPORATION" should read --CONTINUOUSLY OPERATING $^3$HE EVAPORATION--

This certificate supersedes Certificate of Correction issued October 27, 1992

Signed and Sealed this

Fifteenth Day of June, 1993

Attest:

MICHAEL K. KIRK

Attesting Officer     Acting Commissioner of Patents and Trademarks